United States Patent [19]
Kishita et al.

[11] Patent Number: 6,119,473
[45] Date of Patent: Sep. 19, 2000

[54] REFRIGERATION-CYCLE APPARATUS FOR VEHICLE USE

[75] Inventors: Hiroshi Kishita, Anjo; Kurato Yamasaki, Kariya; Yoshiaki Takano, Obu; Satoshi Mizutani, Nagoya, all of Japan

[73] Assignee: Denso Corporation, Kariya, Japan

[21] Appl. No.: 09/116,276

[22] Filed: Jul. 16, 1998

[30] Foreign Application Priority Data

Jul. 17, 1997 [JP] Japan ..................................... 9-192932
Mar. 26, 1998 [JP] Japan ..................................... 10-79649

[51] Int. Cl.[7] ................................................. F25B 49/00
[52] U.S. Cl. .............................. 62/228.4; 62/133; 62/217
[58] Field of Search .................................. 62/228.4, 133, 62/217, 228.5, 228.1

[56] References Cited

U.S. PATENT DOCUMENTS

| | | | |
|---|---|---|---|
| 4,330,999 | 5/1982 | Nakayama | 62/217 |
| 4,395,203 | 7/1983 | Takada | 417/282 |
| 4,796,438 | 1/1989 | Sato | 62/133 |
| 4,880,356 | 11/1989 | Suzuki et al. | 417/53 |
| 4,905,477 | 3/1990 | Kazuhiko Takai | 62/196.3 |
| 4,989,414 | 2/1991 | Murayama et al. | 62/228.4 |
| 5,022,232 | 6/1991 | Sakamoto et al. | |
| 5,257,507 | 11/1993 | Taguchi | 62/133 |
| 5,653,119 | 8/1997 | Kimura et al. | 62/228.5 |
| 5,823,000 | 10/1998 | Takai | 62/133 |

FOREIGN PATENT DOCUMENTS 57-175422  10/1982  Japan.
1-182114   7/1989   Japan.

*Primary Examiner*—William Doerrler
*Assistant Examiner*—Marc Norman
*Attorney, Agent, or Firm*—Harness, Dickey & Pierce, PLC

[57] ABSTRACT

A motor vehicle air conditioner control system that maintains a target cooling vent temperature without sacrificing vehicle engine performance. When a vehicle air conditioning compressor increases to above a predetermined speed and the vehicle engine driving force increases, such as during a period of engine acceleration, compressor cooling capacity becomes saturated and does not increase. When the speed of the compressor rises to a predetermined value and the compressor assumes a high-speed state, thereafter, while the compressor is in the high-speed state, operation of the compressor is controlled so as to sustain the vent-air temperature of an evaporator determined at a time when the high-speed state has been assumed. As a result, the amount of increase of the driving force due to this compressor speed increase is suppressed by reducing the volume of the compressor, thereby resulting in power savings while securing substantially maximum cooling capacity.

19 Claims, 15 Drawing Sheets

| α (°C) | | LARGE ⟵⟶ SMALL |
|---|---|---|
| A/C LOAD | ① Tam | |
| | ② Tr | |
| | ③ Ts | SMALL ⟵⟶ LARGE |
| | ④ TE | |
| | ⑤ W | |
| | ⑥ Tset | LARGE ⟵⟶ SMALL |

REFRIGERATION-CYCLE APPARATUS FOR VEHICLE USE

CROSS-REFERENCE TO RELATED APPLICATIONS

This application relates to and claims priority from Japanese Patent Application Nos. Hei. 9-192932 and Hei. 10-79649, the contents of which are incorporated herein by reference.

TECHNICAL FIELD OF THE INVENTION

This invention relates to a motor vehicle refrigeration-cycle apparatus for an engine-driven air conditioning system that that controls the volume of a system compressor, or causes the compressor to operate intermittently, to realize both power savings and increased cooling performance, particularly when the vehicle engine, and thus the compressor, assume a high-speed operating state.

RELATED ART

Power saving refrigeration-cycle control systems for vehicle engines are known in the art. For example, Japanese Patent Application Laid-open No. Sho 57-175422, Japanese Patent Application Laid-open No. Hei 1-182114, and Japanese Patent Application Laid-open No. Hei 1-254420, propose devices to minimize volume of a compressor during vehicle engine acceleration, reduce compressor driving force of the vehicle engine, and improve vehicle acceleration performance.

Additionally, Japanese Patent Application Laid-open No. Hei 2-249717 proposes a device to stop a compressor or minimize compressor volume during engine acceleration, thereby reducing the compressor driving force of the vehicle engine and improving the acceleration performance of the vehicle. Together with this, passenger-compartment temperature at the time of vehicle engine acceleration is stored. When the passenger compartment temperature becomes higher than this stored temperature by a predetermined temperature, the compressor is restored from the state of control during acceleration to a normal control state, thereby preventing an abnormal rise in passenger-compartment temperature.

Each of the above devices disclosed in the foregoing Japanese Patent Application Laid-open documents is based on determining the accelerating state of a vehicle engine and unconditionally reducing the volume of a compressor to a predetermined volume. None of the systems gives consideration to actual cooling capacity, or to the behavior of compressor driving force and compressor speed in the refrigeration cycle. Consequently, these devices cannot simultaneously realize both vehicle engine power savings and maximum refrigeration cycle cooling performance.

Even in a combination of compressor operation and intermittent control, as disclosed in Japanese Patent Application Laid-open No. Hei 2-249717, a change in passenger-compartment temperature has a temporally large delay with respect to the behavior of the refrigeration cycle, and so realizing both power savings and cooling performance is, in actuality, difficult.

SUMMARY OF THE INVENTION

In light of the foregoing problems, it is an object of this invention to realize both engine power savings and maximum air conditioner cooling performance.

The invention has been devised with attention to actual cooling capacity and to compressor driving force and compressor speed in a refrigeration cycle. Therefore, cycle behavior relating to compressor speed will first be described in specific terms.

FIG. 13 graphically shows experimental data taking cooling performance Q and compressor driving force L as the vertical axis, and taking compressor speed Nc as the horizontal axis. The experimental conditions are ambient cooling air, refrigeration cycle compressor temperature of 35° C., evaporator conditioned air temperature of 35° C., relative humidity of the conditioned air of 40%, and conditioned air quantity of 500 m3/h. The compressor of the refrigeration cycle is a wobble type compressor with a volume of 160 cc.

In the drawing, Q1 and L1 are characteristics when wind speed of the cooling air of a condenser is 4 m/s, Q2 and L2 are characteristics when wind speed of the cooling air of the condenser is 3 m/s, and Q3 and L3 are characteristics when wind speed of the cooling air of the condenser is 2 m/s. The differences among these characteristics Q1 and L1 through Q3 and L3 occur because high-pressure-side refrigeration cycle pressure fluctuates due to the condensation capacity of the condenser. Also, the cooling capacity Q and compressor driving force L fluctuate in accompaniment with the fluctuation of the high-pressure-side pressure.

As shown in FIG. 13, during ordinary operation, when the compressor speed Nc is in a comparatively low region, the cooling capacity Q and the compressor driving force L both increase as the speed Nc rises. When the speed Nc rises to close to 2,000 rpm, however, only the compressor driving force L increases, and the cooling capacity Q becomes saturated and does not substantially increase.

Such saturation of the cooling capacity Q in a high-speed region of the compressor occurs because refrigerant flow velocity within the cycle increases and pressure suddenly increases due to the speed rise of the compressor, and increase in refrigerant flow within the cycle becomes saturated.

According to the present invention, as shown in FIG. 13, even when the compressor speed Nc increases and the driving force increases in a high-speed region where the compressor speed Nc exceeds a predetermined speed (in the characteristics of FIG. 10, 2,000 rpm), the cooling capacity Q becomes saturated and does not increase. Attention is given to this point, and the amount of increase (indicated by slanted-line area A in FIG. 13) of the driving force L due to this compressor speed Nc is suppressed by volume reduction of the compressor or stopping operation of the compressor, effectively demonstrating a power-saving effect while securing substantially maximum cooling capacity.

According to one embodiment of the present invention, a volume-varying mechanism communicates with the compressor to continuously vary the volume of the compressor chamber. The volume is varied so that, when compressor speed exceeds a predetermined rate, the compressor cooling capacity becomes saturated and does not increase beyond a predetermined saturation level.

According to another embodiment of the present invention, operation of the compressor is controlled to be intermittent, to sustain a degree of chilling of the evaporator corresponding to the degree of chilling achieved when the high-speed state was assumed. The compressor driving force, can effectively be reduced by the intermittent compressor control while the compressor cooling capacity can be maintained at a maximum capacity level as determined just prior to the compressor reaching a predetermined threshold speed.

According to another embodiment of the present invention, a volume-switching mechanism communicates with the compressor to switch compressor volume among discrete compressor volume stages in response to external control signals. At a time when the compressor speed increases to a predetermined value or more, and the compressor assumes a high-speed state, compressor volume is switched among stages to sustain a degree of chilling of the evaporator that corresponds to the degree of chilling at a time when the high-speed state was assumed. The volume is switched as described above while the compressor remains in the high-speed state.

DETAILED DESCRIPTION OF THE PRESENT INVENTION

Embodiments of this invention will be described hereinafter with reference to the drawings.

First Embodiment

Figure 1:
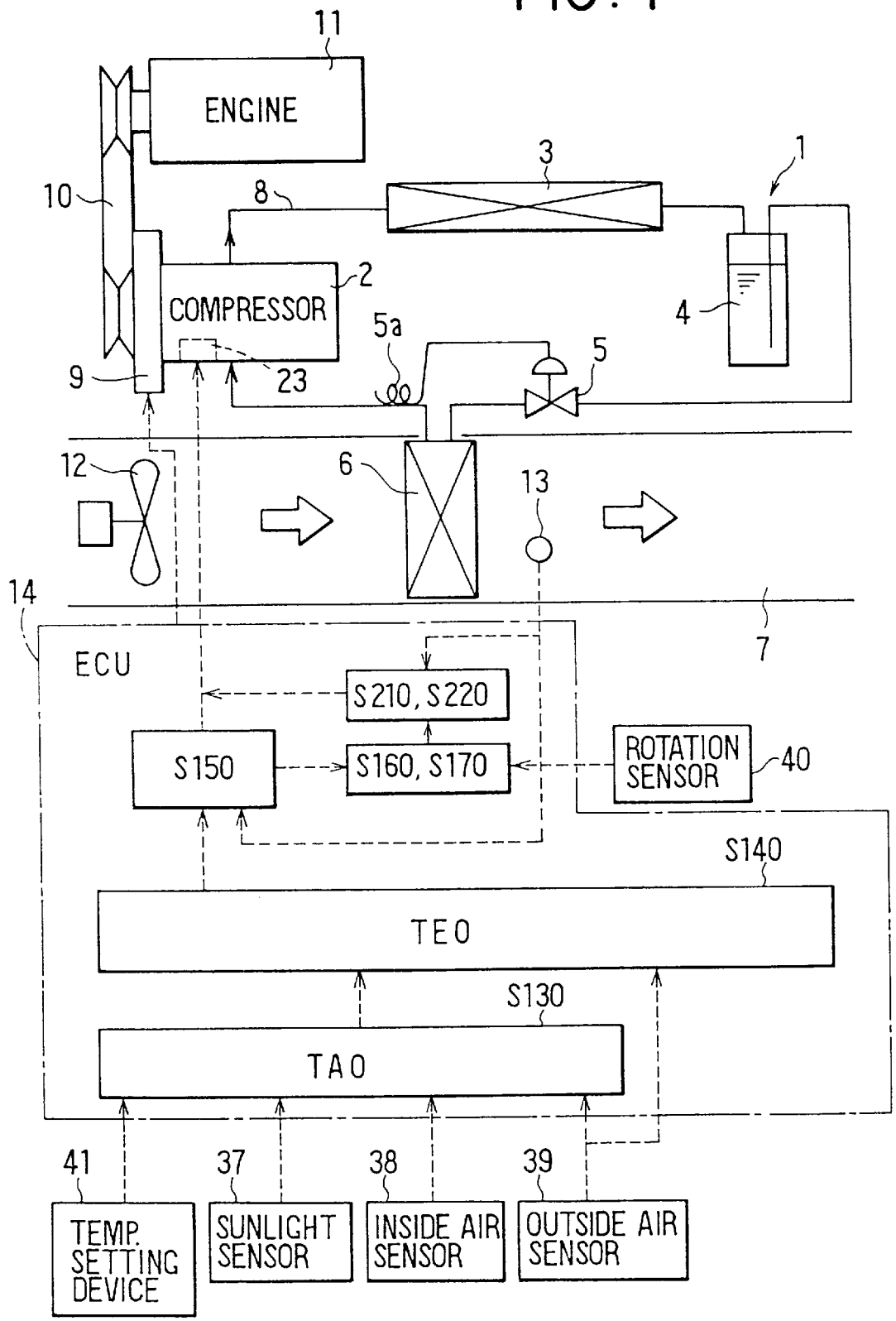
FIG. 1 is an overall structural view of a refrigeration-cycle apparatus for vehicle use indicating a first embodiment of this invention.

FIG. 1 is an overall structural view of a first embodiment of this invention. This embodiment discloses a refrigeration-cycle apparatus applied in a vehicle air-conditioner. A refrigeration cycle 1 includes a compressor 2 that receives, compresses, and discharges refrigerant. High-temperature, high-pressure superheated gas discharged from this compressor flows into a condenser 3, and exchanges heat with outside air blown by a cooling fan (not illustrated), to cool and condense the refrigerant.

The condensed refrigerant then flows into a receiver (vapor-liquid separator) 4, where the refrigerant vapor and liquid are separated, and excess liquid refrigerant is accumulated. The pressure of the liquid refrigerant in this receiver 4 is reduced by an expansion valve 5, and assumes a vapor-liquid two-phase state. The low-pressure refrigerant from this expansion valve 5 then flows into an evaporator 6. This evaporator 6 is disposed within an air-conditioning duct 7 of the vehicle-use air-conditioning apparatus, and low-pressure refrigerant in the evaporator 6 absorbs heat from air in the air-conditioning duct 7 and evaporates.

The expansion valve 5 is a temperature-type expansion valve having a temperature-sensing tube 5a to sense temperature of outlet refrigerant of the evaporator 6, and to adjust the valve opening so as to maintain the superheating of the outlet refrigerant of the evaporator 6 at a predetermined value. The above-described cycle component parts (1 through 6) are respectively interconnected by refrigerant piping 8. The compressor 2 is driven by a vehicle engine 11 via an electromagnetic clutch 9, belt 10, and so on.

A blower 12 is located in the air-conditioning duct 7. Air inside the passenger compartment or air outside the passenger compartment taken in from an inner/outer-air switchbox (not illustrated) of known art is blown inside the air-conditioning duct 7 by the blower 12. This blown air passes through the evaporator 6, through a heater unit (not illustrated) and is vented through a vent inside the passenger compartment.

An evaporator vent-temperature sensor 13 is located in the duct 7 and detects the temperature of air immediately after the air passes through the evaporator 6.

The above-mentioned heater unit is a device of known art, and is provided with a hot-water type heater core to reheat chilled air which has passed through the evaporator 6, an air-mixing door or hot-water flow control valve that regulates the degree of heating in this hot-water type heating core, and so on. At an air downstream end of the air-conditioning duct 8, a face vent to blow air toward the upper body of a rider in the passenger compartment, a foot vent to blow air toward the feet within the passenger compartment, and a defroster vent to blow air toward the inner surface of the windshield, and vent-mode doors to switchably open and close these vents are provided.

The electromagnetic clutch 9 of the above-described compressor 2 is connected to an electronic control unit (hereinafter termed "ECU") 14 for air-conditioning use. When the electromagnetic clutch 9 is energized based on a control signal from the ECU 14, the clutch assumes a connected state, driving force from the vehicle engine 11 is conveyed to the compressor 2, and the compressor 2 assumes a running state. In contrast to this, when energization of the electromagnetic clutch 9 is interrupted, the electromagnetic clutch 9 assumes a released state, and the compressor 2 stops.

Figure 2:
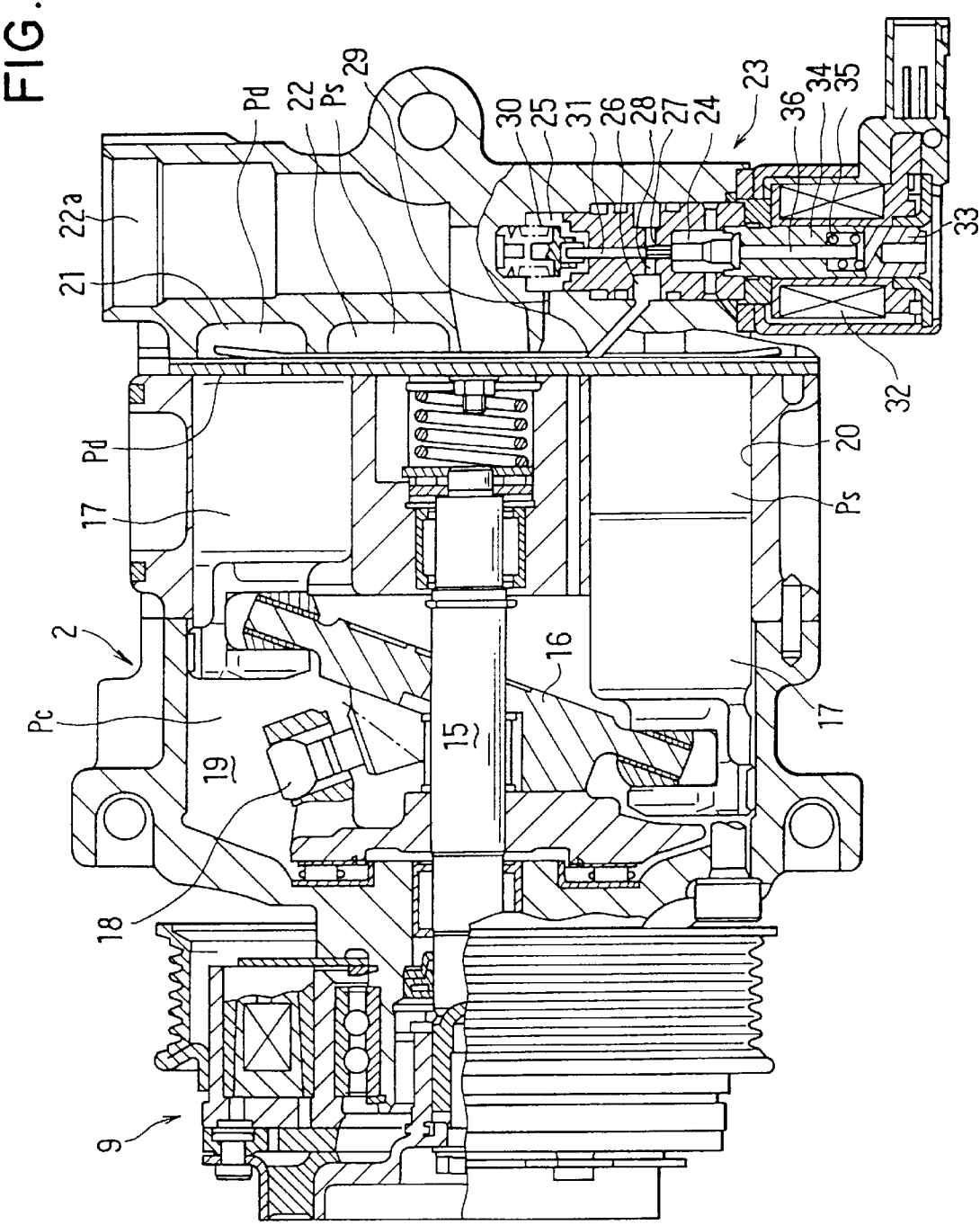
FIG. 2 is a longitudinal sectional view of a variable-volume compressor according to the first embodiment.

Next, FIG. 2 depicts a specific structural example of the above-described compressor 2 and electromagnetic clutch 9. The compressor 2 is a known wobble-type device of known art. A vehicle engine driving force is conveyed via the electromagnetic clutch 9 to a compressor rotating shaft 15 to rotate the shaft. A swash plate 16 is integrally and rotatably interconnected with the rotating shaft 15, and a piston 17 axially reciprocates due to the rotation of this swash plate 16.

Further, the stroke of the piston 17 is changed by a change in the tilt angle of the swash plate 16 to vary the compressor discharge volume. Because of this, the swash plate 16 is rockably interconnected to the rotating shaft 15. In specific terms, the swash plate 16 is rockably supported by a spherical support 18. The tilt angle of the swash plate 16 changes according to pressure within a crank chamber 19 that acts on a rear surface of the piston 17. That is, tilt changes according to control pressure Pc, and pressure (discharge pressure Pd and intake pressure Ps) within a cylinder 20 in which the piston 17 reciprocates. Consequently, the tilt angle of the swash plate 16 can be changed by adjusting the control pressure Pc in the crank chamber 19.

Gas refrigerant compressed by the cylinder 20 is discharged from a discharge chamber 21 through a discharge port (not illustrated) toward the condenser 3 of FIG. 1. Additionally, refrigerant enters the cylinder 20 through an intake chamber 22. This intake chamber 22 communicates with a refrigerant-outlet side of the evaporator of FIG. 1 via an intake port 22a.

Accordingly, pressure Pc of the foregoing crank chamber 19 is changed by an electromagnetic-type pressure controller 23 utilizing the refrigerant discharge pressure Pd of the discharge chamber 21 and the refrigerant intake pressure Ps of the intake chamber 22.

Referring to FIGS. 3 and 4, this electromagnetic-type pressure controller 23 is provided with a discharge-pressure chamber 24 that communicates with the discharge chamber 21, an intake-pressure chamber 25 that communicate with the intake-chamber 22, and a control-pressure chamber 26 that communicates with the crank chamber 19. The discharge pressure chamber 24 communicates with the control-pressure chamber 26 via a variable aperture 28, the opening degree of which is adjusted by a valve body 27. The intake-pressure chamber 25 communicates with the control-pressure chamber 26 via a fixed aperture 29.

An expandable bellows 30 is disposed within the intake-pressure chamber 25. A predetermined pressure Pb is established in this bellows 30. The bellows 30 expands and contracts due to change in the intake pressure Ps with respect to this internal pressure Pb, and displaces the valve body 27 via a rod 31. Electromagnetic force of an electromagnetic mechanism also acts on this bellows 30 and the valve body 27.

That is to say, the electromagnetic mechanism of this embodiment is made up of an electromagnetic coil 32, a fixed magnetic-pole member 33, a movable magnetic-pole member (plunger) 34 pulled in the direction of the fixed magnetic-pole member 33 (i.e., the direction of bellows 30 expansion) by the electromagnetic force of the electromagnetic coil 32, and a coil spring 35 which exerts spring force on the movable magnetic-pole member 34. A rod 36 is interconnected with a central portion of the movable magnetic-pole member 34, the rod 36, the valve body 27, and the rod 31 are integrally interconnected and integrally displaced.

FIGS. 3 and 4 illustrate a mode of operation by the foregoing electromagnetic-type pressure controller 23, and simplify illustration of the disposed state of the several portions of the electromagnetic-type pressure controller 23.

Figure 3A:
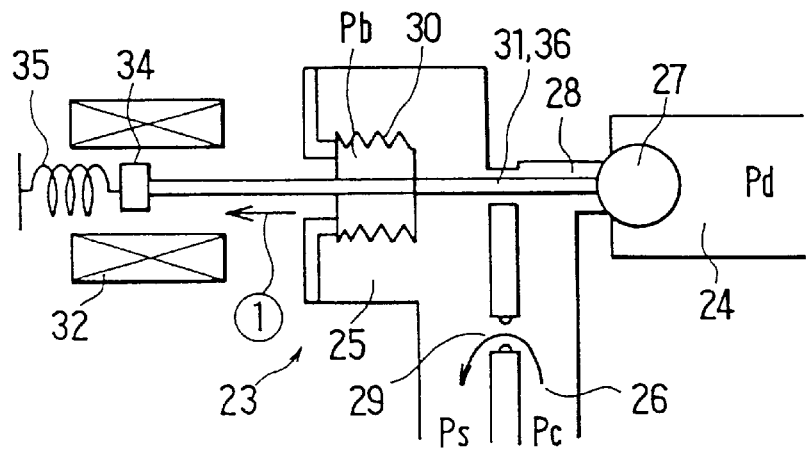
FIG. 3 is a typical drawing for describing operation at a time of large volume of the compressor of FIG. 2.

FIG. 3 depicts a state wherein volume of the compressor 2 has increased. When the intake pressure Ps rises above the internal pressure Pb of the bellows 30 due to an increase in cooler load, the bellows 30 contracts. Thus, the rods 31 and 36 move in the direction of arrow (1) in FIG. 3(a). Therefore, the valve body 27 is displaced in the same direction, and reduces the opening of the variable aperture 28. Consequently, pressure loss between the discharge-pressure chamber 24 and the control-pressure chamber 26 increases, and the control pressure Pc in the control-pressure chamber 26 decreases.

Figure 3B:
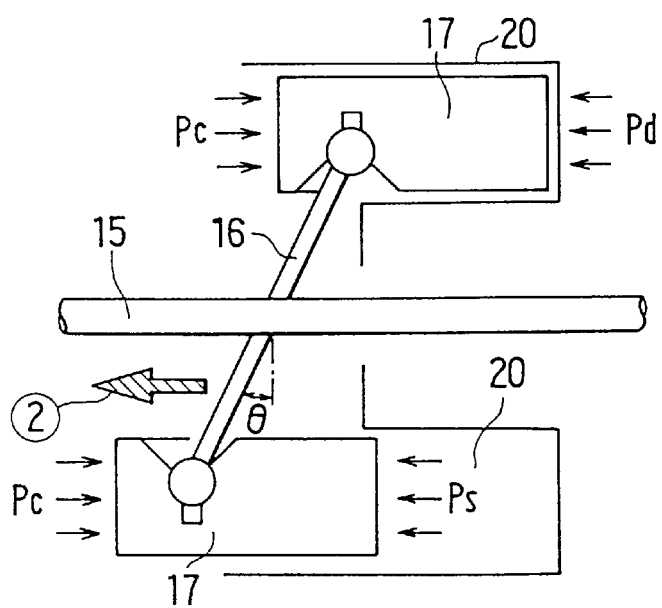
Figure 4A:
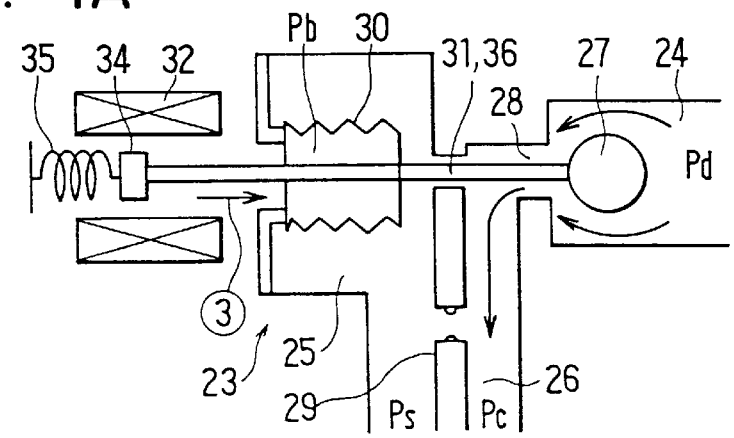
FIG. 4 is a typical drawing for describing operation at a time of small volume of the compressor of FIG. 2.

Because the pressure of the crank chamber 19 falls and the back pressure of the piston 17 falls due to this decline in the control pressure Pc, the swash plate 16 tilts and the tilt angle θ of the swash plate 16 increases, as shown by arrow (2) in FIG. 3(b). As a result, the stroke of the piston 17 increases, and the volume of the compressor 2 rises. Due to this, cycle-circulating refrigerant flow increases and cooling capacity rises, and so the intake pressure Ps correspondingly decreases.

Conversely, when the intake pressure Ps drops below the internal pressure Pb of the bellows 30, the bellows 30 expands. The rods 31 and 36 move in the direction of arrow (3) in FIG. 4(a). Owing thereto, the valve body 27 is displaced in the same direction, increasing the opening of the variable aperture 28. Consequently, pressure loss between the discharge-pressure chamber 24 and the control-pressure chamber 26 decreases, and the control pressure Pc in the control-pressure chamber 26 increases.

Figure 4B:
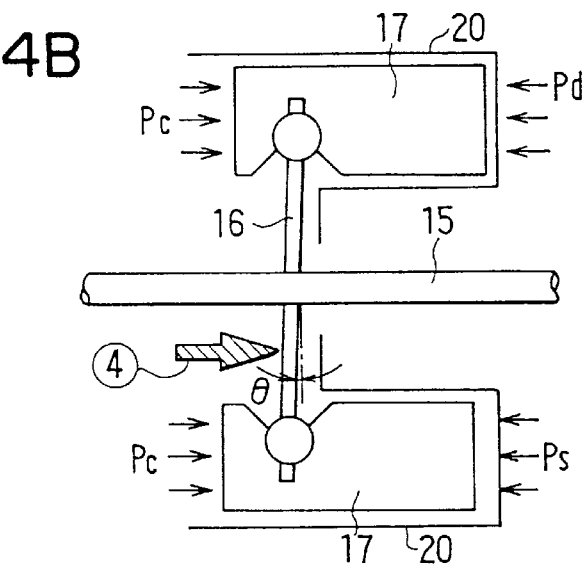

When the pressure of the crank chamber 19 rises due to this rise in the control pressure Pc, the swash plate 16 straightens and the tilt angle θ of the swash plate 16 decreases, as shown by arrow (4) in FIG. 4(b). Because of this, the stroke of the piston 17 decreases and the volume of the compressor 2 declines. Due to this, cycle-circulating refrigerant flow decreases and cooling capacity declines, and so the intake pressure Ps correspondingly rises.

Thus, an electromagnetic-mechanism portion varies the pressure set for intake pressure Ps by the internal pressure Pb of the bellows 30 to adjust the control pressure Pc and to variably control the compressor volume by the bellows 30 expanding or contracting in correspondence with change in intake pressure Ps. The direction of electromagnetic force of the electromagnetic coil 32 is the direction in which the bellows 30 expands. Consequently, the force of the electromagnetic coil 32 is exerted on the valve body 27 in the opening direction of the variable aperture 28.

Figure 5:
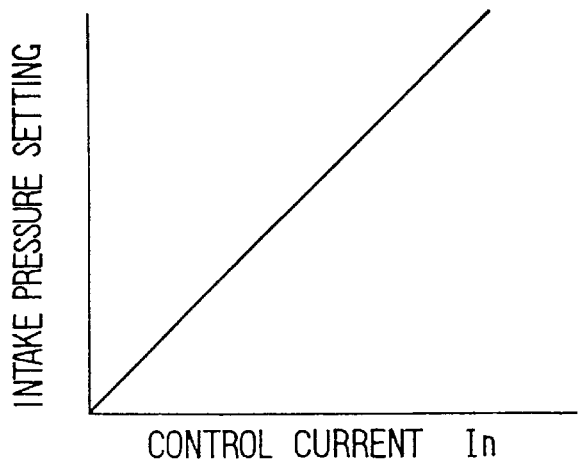
FIG. 5 is a characteristic diagram indicating the correlation between a control current In and a set pressure of a intake pressure Ps of an electromagnetic-type pressure controller disposed in the compressor of FIG. 2.

Meanwhile, the force of the electromagnetic coil 32 is proportional to the control current In flowing to the electromagnetic coil 32, and so the electromagnetic force of the electromagnetic coil 32 expands the opening of the variable aperture 28, increases the control pressure Pc, and reduces the compressor volume as this control current In increases. Consequently, the setting pressure for the intake pressure Ps rises together with the increase in the control current In as shown in FIG. 5. Owing to this, the intake pressure Ps changes and the evaporator blown-air temperature can be adjusted by changing the control current In.

As is understood from the foregoing description of the volume variation mode of operation, with this embodiment, the swash plate 16 doubles in function as a volume-varying member, and, together with the electromagnetic-type pressure controller, as a volume-varying mechanism. It is contemplated that the external variable-volume compressor 2 for which volume is continuously varied by the control current In applied from an external controller as was described above is for installation in a luxury vehicle.

A control system of this embodiment will be described next with reference to the above-mentioned FIG. 1. An ECU (electronic control unit) 14 comprises a microcomputer of known art made up of a CPU, ROM, RAM, and the like (not illustrated), and peripheral circuitry thereof. Various sensors to detect information required for air-conditioning control are, in addition to the evaporator vent-temperature sensor 13, connected to an input pin of the ECU 14. Specifically, a sunlight sensor 37 for detecting the amount of incident sunlight inside the passenger compartment, an inside-air sensor 38 which is a device for detecting temperature inside the passenger compartment, an outside-air sensor 39 which is a device for detecting temperature outside the passenger compartment, and a speed sensor 40 which is a device for detecting compressor speed are connected. In addition, a temperature-setting device 41 is also connected to an input pin of the ECU 14 to allow a rider within the passenger compartment to manually set a desired set temperature.

Signals from the sensors 13 and 37–40 and the temperature-setting device 41 undergo A/D conversion by an input circuit (not illustrated) within the ECU 14, and are then input to the microcomputer. The ECU 14 is supplied with electrical power from a vehicle-mounted battery (not illustrated) when an engine ignition switch (not illustrated) and an auto air conditioner switch are switched on.

Control processing performed by the microcomputer in this embodiment will be described next with reference to the flow diagram in FIG. 6.

Figure 6:
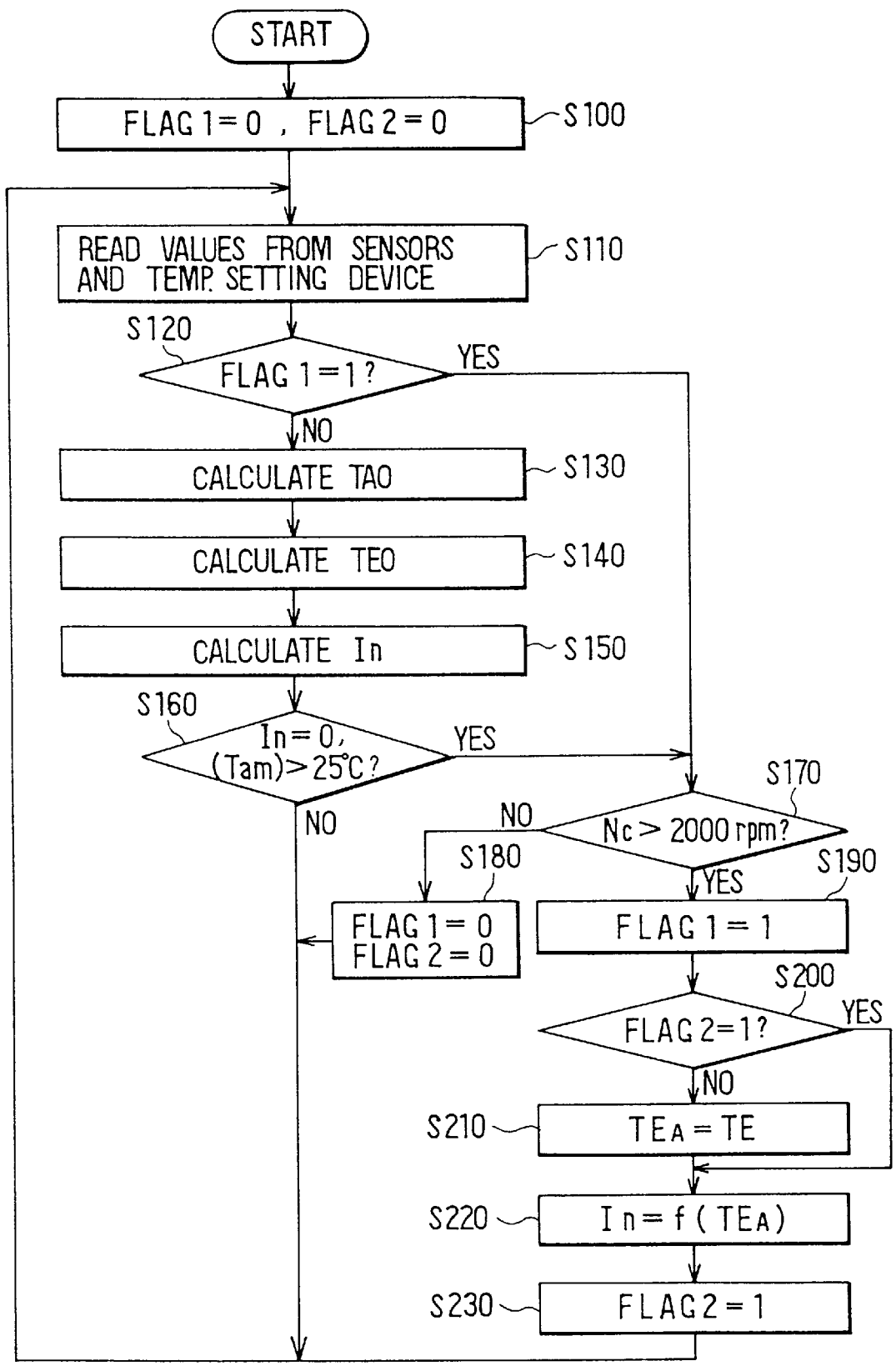
FIG. 6 is a flow diagram indicating control processing of the first embodiment.

First, when the engine ignition switch and the auto air conditioner switch are switched on, the ECU 14 is supplied with electrical power and the control routine in FIG. 6 is started. At step S110, flag 1 is initialized to 0 and flag 2 is initialized to 0. Next, the respective values of the several sensors 13 and 37 through 40 are read, and a signal is read from the temperature-setting device 41.

Because flag 1 has been initialized to 0, the determination at the subsequent step S120 is negative, and execution advances to step S130. A target vent temperature TAO (hereinafter termed "TAO"), which is a target temperature for conditioned air blown into the passenger compartment, is calculated from equation 1 on a basis of the values read in the foregoing step S110.

Expression 1

$$TAO = Tset * Kset - Tr * Kr - Tam * Kam - Ts * Ks + C$$

Where

| Tset: | Set temperature of the temperature-setting device 41 |
|---|---|
| Tr: | Inside-air temperature detected by inside-air sensor 38 |
| Tam: | Outside-air temperature detected by the outside-air sensor 39 |
| Ts: | Amount of sunlight detected by the sunlight sensor 37 |
| Kset, Kr, Kam, Ks: | Control gain |
| C: | Constant |

Next, at step S140, a target evaporator vent temperature TEO is determined. Determination of this target evaporator vent temperature TEO is performed based on a first target evaporator vent temperature TEO1 and a second target evaporator vent temperature TEO2 which will be described hereinafter.

Figure 7:
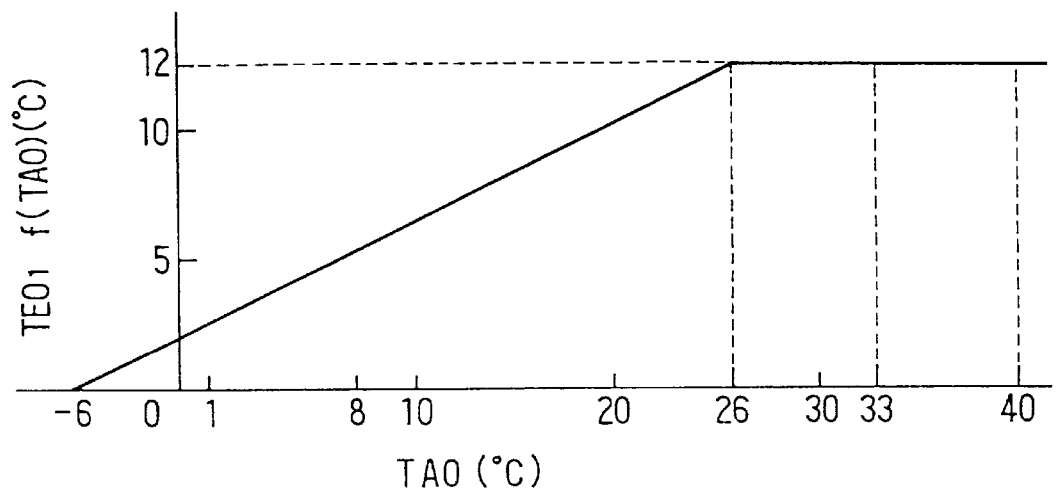
FIG. 7 is a characteristic diagram indicating the correlation between a target vent temperature TAO and a first target evaporator vent temperature f (TAO) according to the first embodiment.

Firstly, a determination method for the first target evaporator vent temperature TEO1 will be described in specific terms. FIG. 7 is a map established and stored in the ROM of the microcomputer. Based on this map, the first target evaporator vent temperature TEO1 increases as TAO increases. Consequently, TEO1 can be represented as f (TAO).

Figure 8:
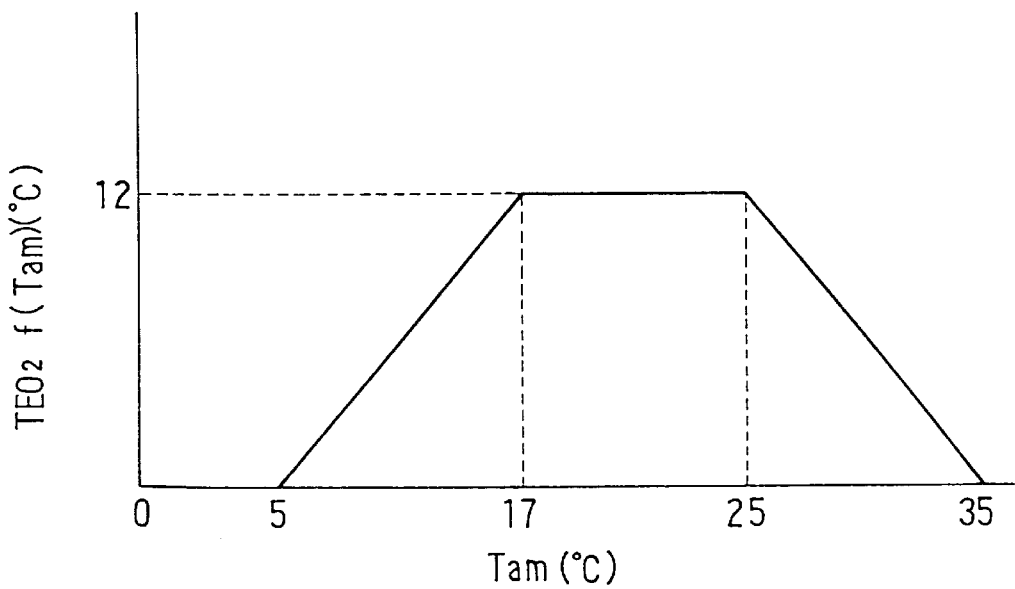
FIG. 8 is a characteristic diagram indicating the correlation between a second target evaporator vent temperature f (Tam) and an outside-air temperature Tam according to the first embodiment.

Next, the second target evaporator vent temperature TEO2 as well is established on a basis of a map in FIG. 8 stored in the ROM of the microcomputer. The second target evaporator vent temperature TEO2 is established in correspondence with the outside-air temperature Tam. In an intermediate-temperature range of the outside-air temperature Tam (in the example of FIG. 8, 17° C. through 25° C.), the need for cooling and dehumidifying declines, and so the second target evaporator vent temperature TEO2 is set high (in the example of FIG. 8, 12° C.), to achieve engine power savings by reducing the volume of the compressor 2.

Meanwhile, to obtain cooler capacity at a time of high temperature when the outside-air temperature Tam exceeds 25° C., the second target evaporator vent temperature TEO2 falls in inverse proportion to the rise of the outside-air temperature Tam. Meanwhile, to obtain dehumidifying capacity to prevent window-glass fogging in a low-temperature range where the outside-air temperature Tam falls below 17° C., the second target evaporator vent temperature TEO2 falls together with the decline in the outside-air temperature Tam. Consequently, TEO2 can be represented as f (Tam).

Accordingly, the target evaporator vent temperature TEO is ultimately determined based on equation 2 on a basis of the foregoing first and second target evaporator vent temperatures TEO1 and TEO2.

$$TEO = MIN\ (f\ (TAO),\ f\ (Tam)) \qquad [2]$$

That is to say, the smaller of the foregoing first target evaporator vent temperature TEO1=f (TAO) and second target evaporator vent temperature TEO2=f (Tam) ultimately is selected as the target evaporator vent temperature TEO.

Next, execution advances to step S150, and the control-current value In is determined on a basis of the actual evaporator vent temperature TE detected by the evaporator vent-temperature sensor 13 and the target evaporator vent temperature TEO so that TE becomes equal to TEO.

In specific terms, at step S150 the control-current value In of the electromagnetic coil 32 is calculated and output based on equation 3 and equation 4. Feedback control according to these equations is proportional integral control (PI control).

$$En = TE - TEO \quad [3]$$

Expression 4

| $In = In - 1 - Kp \{(En - En - 1) + \theta/Ti \times En\}$ Where | |
|---|---|
| En: | Evaporator vent-temperature deviation |
| Kp: | Proportional constant |
| θ: | Sampling time |
| Ti: | Integration time |

With the electromagnetic-type pressure controller 23, the setting pressure of the intake pressure Ps is determined in correspondence with the control-current value In calculated as was described above. Also, the volume of the compressor 2 is variably controlled so as to become this setting pressure. As a result, the actual evaporator vent temperature TE is maintained at the target evaporator vent temperature TEO.

Next, at step S160, it is determined whether the volume of the compressor 2 is within a variable range, or, stated differently, whether the compressor 2 is in a running state proximate to maximum volume. In specific terms, it is determined whether the outside-air temperature Tam has exceeded 25° C. if the control-current value In of the electromagnetic coil 32 is equal to 0. That is, a control-current value In equal to 0 signifies that the setting value of the intake pressure Ps has been minimized by the electromagnetic-type pressure controller 23 according to the characteristic diagram of FIG. 5, and the volume of the compressor 2 increases. Additionally, an outside-air temperature Tam exceeding 25° C. signifies that the second target evaporator vent temperature TEO2 has been lowered according to the control map of FIG. 8, and the volume of the compressor 2 increases.

Consequently, when the foregoing two conditions are simultaneously fulfilled, it can be determined that the compressor 2 is in a running state proximate to maximum volume. Conversely, when even one of the foregoing two conditions is not fulfilled, it can be determined that the volume of the compressor 2 is in a variable range (i.e., a capacity-control range).

When the determination of step S160 is negative and it is determined that the volume of the compressor 2 is in the variable range, the compressor-volume control at an ordinary time according to the above-described step S150 continues.

Meanwhile, when the determination of step S160 is affirmative and the compressor is in a running state proximate to maximum volume, execution advances to step S170 and it is determined whether the compressor 2 is in a high-speed state such as an engine acceleration state. Specifically, with this embodiment, it is determined whether the compressor speed Nc detected by the speed sensor 40 has exceeded 2,000 rpm. When Nc is lower than 2,000 rpm, execution advances to step S180, and flags 1 and 2 are set to 0. Consequently, the compressor-volume control at an ordinary time according to the above-described step S150 continues.

In contrast thereto, when the compressor speed Nc exceeds 2,000 rpm, execution advances from step S170 to step S190, and flag 1 is set to 1. The determination in the subsequent step S200 becomes negative. At step S210, the evaporator vent temperature TEA at the time when the compressor speed Nc exceeded 2,000 rpm is set as the evaporator vent temperature TE.

Accordingly, at step S220, the control-current value In is calculated from the foregoing evaporator vent temperature TEA, and high speed compressor control is performed.

Figure 9:
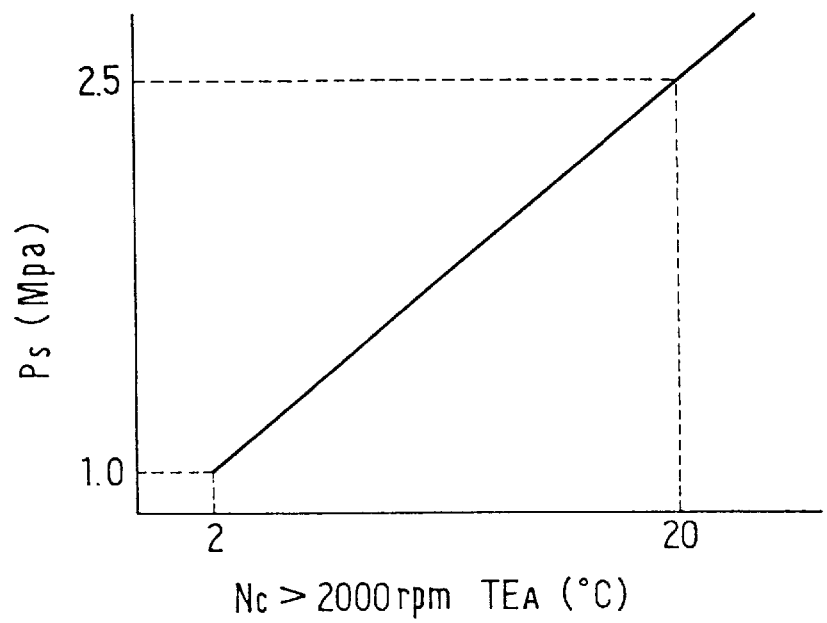
FIG. 9 is a characteristic diagram indicating the correlation between an evaporator vent temperature TEA and the intake pressure Ps according to the first embodiment.
Figure 10:
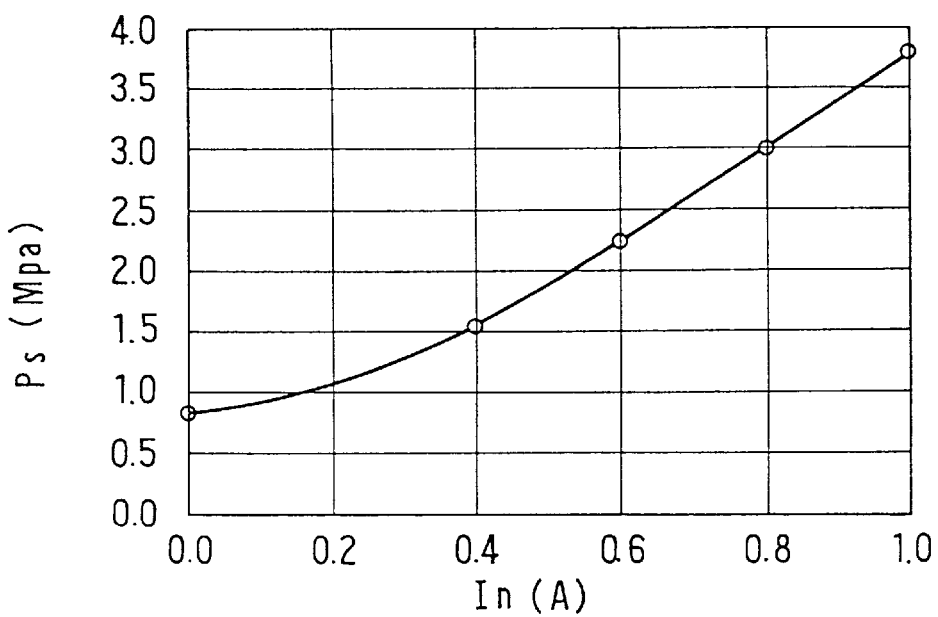
FIG. 10 is a characteristic diagram indicating the correlation between the intake pressure Ps and the control current In of the electromagnetic-type pressure controller according to the first embodiment.

To describe this high-speed compressor control in more specific terms, FIG. 9 and FIG. 10 both are maps established and stored in the ROM of the microcomputer, and the control-current value In is calculated on a basis of these maps. That is, the compressor intake pressure Ps is estimated from the evaporator vent temperature TEA at the time when the compressor speed Nc exceeded 2,000 rpm according to the map shown in FIG. 9, and In is determined according to the map shown in FIG. 10 so that the control-current value In becomes larger in correspondence with a rise in the compressor intake pressure Ps.

In the subsequent step S230, flag 2 is set to 1. Thereafter, while the compressor speed Nc is greater than 2,000 rpm, the control-current value In is determined from the evaporator vent temperature TEA at the time when the compressor speed Nc exceeded 2,000 rpm according to step S220, and control of the volume of the compressor 2 continues so as to maintain the evaporator vent temperature at TEA. When the compressor speed Nc drops and Nc becomes less than or equal to 2,000 rpm, compressor-volume control at an ordinary time according to step S150 is restored.

Because this invention is characterized by the above-described control of compressor volume when at high speed (i.e., the control of steps S210 and S220), technical significance thereof will be described in comparison with compressor-volume control when at an ordinary time (i.e., the control of step S150).

Figure 11:
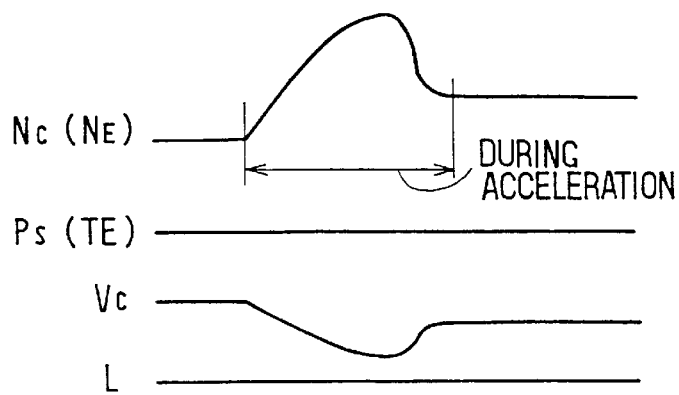
FIG. 11 is a explanatory operational diagram when the compressor volume is in a variable range.

FIG. 11 indicates change in the compressor intake pressure Ps (=evaporator vent temperature TE), the compressor volume vc, and the compressor driving force L with respect to change in the compressor speed Nc (=engine speed NE) during ordinary control (volume-variable range) of compressor volume at step S150. When compressor intake pressure Ps attempts to decline due to a rise in compressor speed during vehicle acceleration or the like, the bellows 30 expands, raising the control pressure Pc and reducing the compressor volume Vc.

This prevents a drop in the compressor intake pressure Ps and maintains the compressor intake pressure Ps (TE) at the target value. Further, because the compressor driving force L can be maintained even during acceleration due to a drop in the compressor volume Vc, deterioration of vehicle engine performance due to an increase in the driving force of the compressor 2 during high engine speed, such as during acceleration, is prevented.

When the intake pressure Ps rises during ordinary compressor volume control at step S150, the bellows 30 contracts and lowers the control pressure Pc. Therefore, the compressor volume increases and prevents a rise in the intake pressure Ps.

Figure 12:
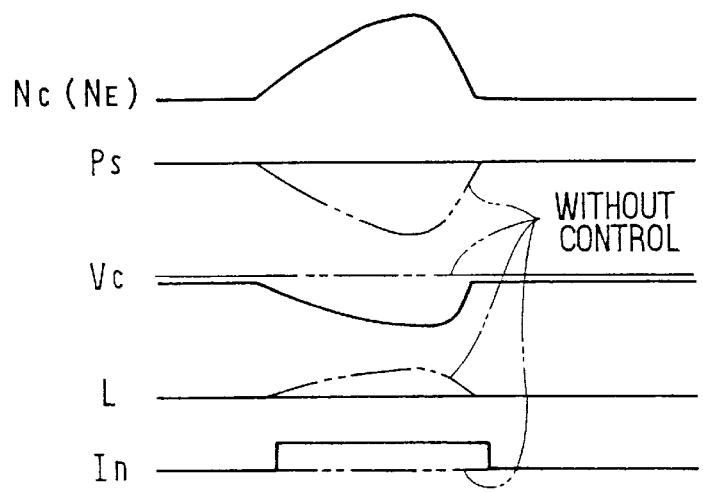
FIG. 12 is a explanatory operational diagram when the compressor volume is at maximum volume.

Meanwhile, FIG. 12 indicates a change in the compressor intake pressure Ps, the compressor volume Vc, the compressor driving force L, and the control-current value In with respect to change in the compressor speed Nc (=engine speed NE) at a time of maximum volume of compressor volume at steps S210 and S220. In FIG. 12, the double-dotted line portions of the compressor intake pressure Ps, the compressor volume Vc, the compressor driving force L, and the control-current value In indicate a case where the control is not performed at high speed, as in steps S210 and S220.

In a case where high speed control is not performed, the compressor speed Nc rises. Even when the compressor intake pressure Ps falls, the cooling capacity Q is saturated according to the above-described characteristics of FIG. 13, and the evaporator vent temperature TE does not drop.

As a result thereof, the compressor volume Vc remains held at the maximum pressure so as to make the actual evaporator vent temperature TE approach the target evaporator vent temperature TEO, even after the compressor speed Nc has risen, and the compressor driving force L rises as shown by the double-dotted line in FIG. 12 when the compressor is at high speed (during vehicle acceleration or the like), causing vehicle acceleration performance to deteriorate.

Conversely, when at high speed as in steps S210 and 220, the control-current value In is determined from the actual evaporator vent temperature TEA at the time when the compressor speed Nc becomes greater than 2,000 rpm. This control-current value In is held while Nc is greater than 2,000 rpm Due to this, the compressor driving force L can be held at approximately the rise of the compressor speed Nc, and vehicle traveling performance can be improved compared with a case of rise as shown by the double-dotted line in FIG. 12.

Figure 13:
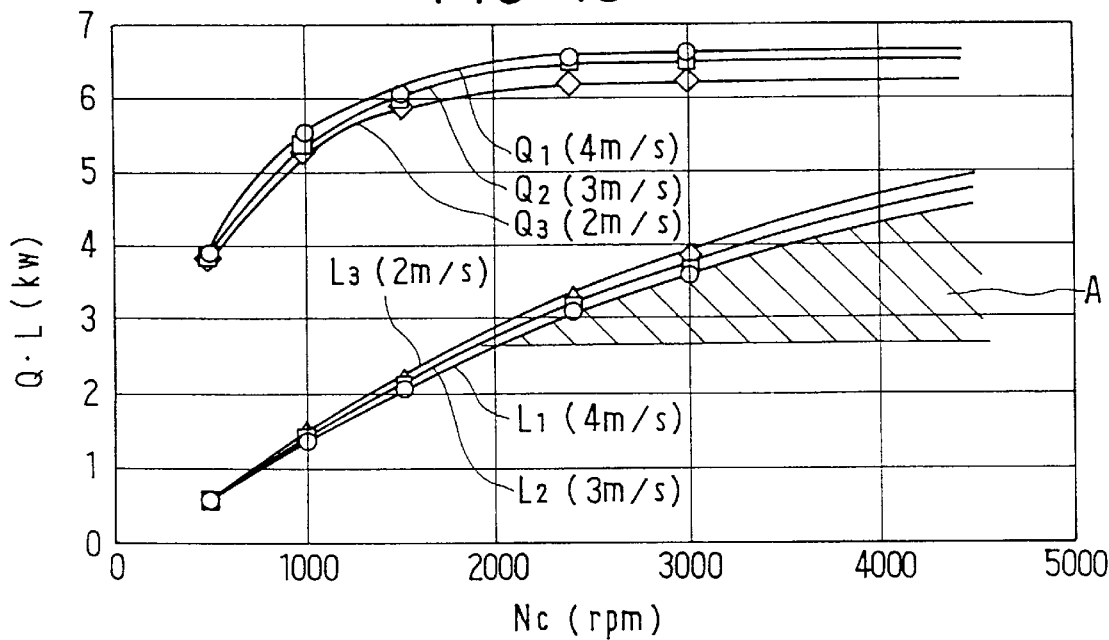
FIG. 13 is a graph indicating the relationship among compressor speed, cooling capacity, and compressor driving force.

Moreover, the reduced portion of the foregoing compressor volume Vc is volume reduction performed in the high-speed range of Nc>2,000 rpm in the characteristics of FIG. 13. That is to say, the saturation region of cooling capacity Q. Therefore, it becomes possible to reduce solely the compressor driving force L, with the cooling capacity Q remaining maintained proximately to the maximum capacity, which is extremely advantageous in practical application.

FIG. 1 is a block diagram depicting the devices that realize the functions in the ECU 14 which correspond to the several steps of the flow diagram shown in FIG. 6.

Second Embodiment

The foregoing first embodiment relates to a refrigeration-cycle apparatus provided with an external variable-volume compressor 2 which continuously varies the volume according to the control current In. The second embodiment, however, utilizes a refrigeration-cycle apparatus with a fixed-volume type compressor.

Figure 14:
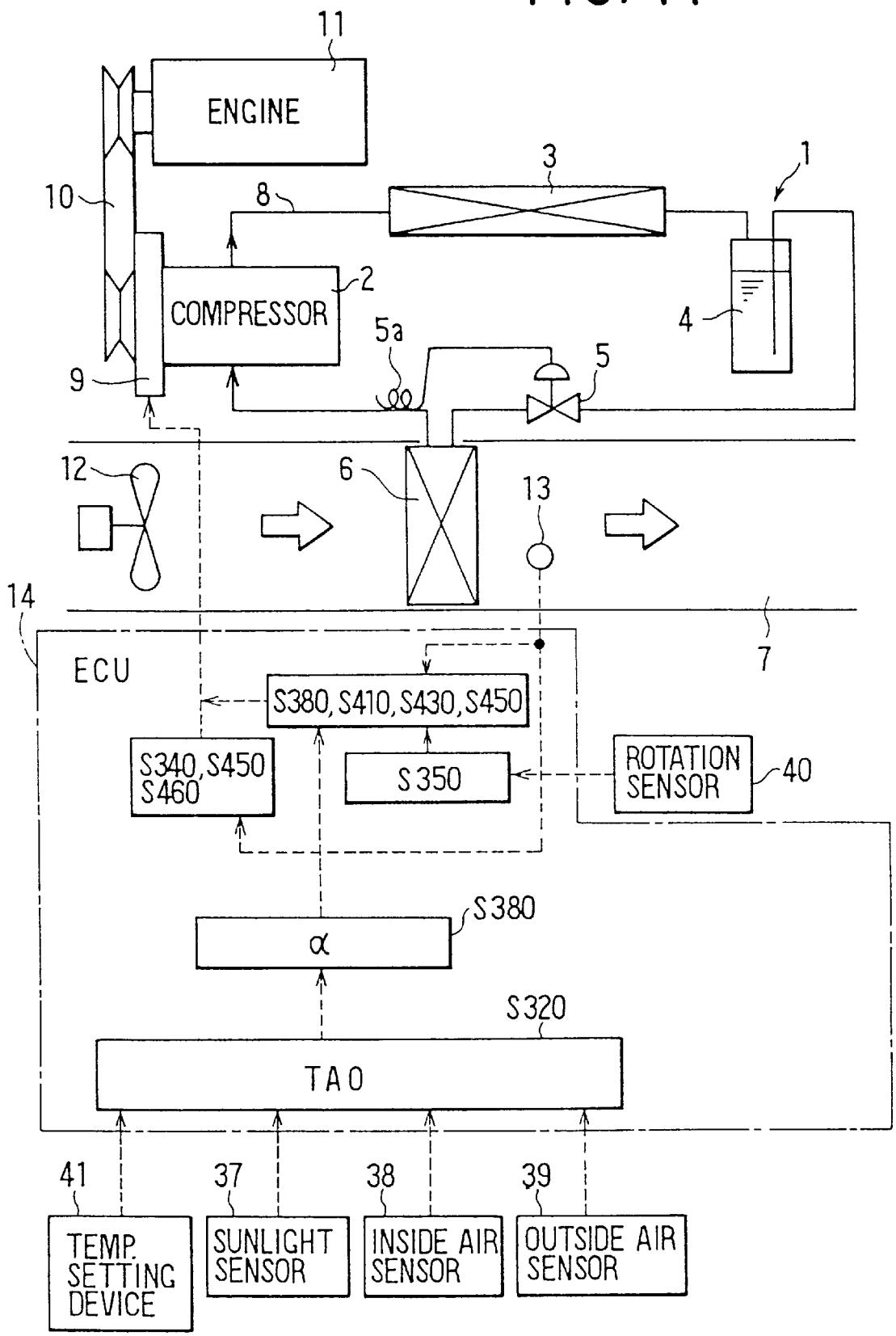
FIG. 14 is an overall structural view of a refrigeration-cycle apparatus for vehicle use indicating a second embodiment.

FIG. 14 depicts a refrigeration-cycle apparatus employing a fixed-volume type compressor 2 according to the second embodiment. The second embodiment controls the electromagnetic clutch in an intermittent (on/off) manner as the control target of the ECU 14 accompanying utilization of a fixed-volume type compressor 3.

Control processing performed by the ECU 14 in the second embodiment will be described next with reference to the flow diagram in FIG. 15.

Figure 15:
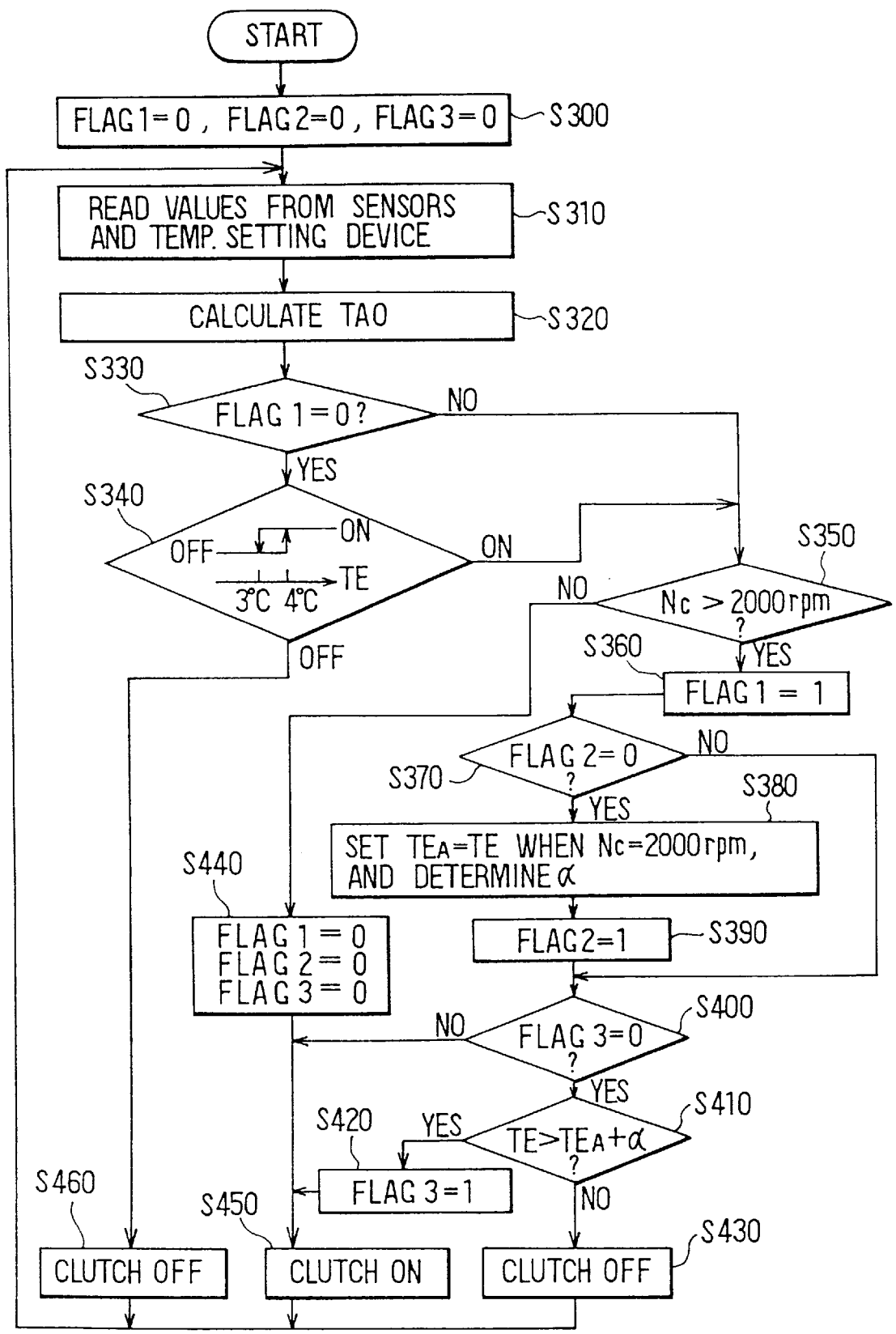
FIG. 15 is a flow diagram indicating control processing of the second embodiment.

First, when the ignition switch of the vehicle engine 11 is switched on and the auto air conditioner switch is switched on, the ECU 14 is supplied with electrical power, and the control routine in FIG. 15 is started. At step S300, flag 1 is initialized to 0, flag 2 is initialized to 0, and flag 3 is initialized to 0.

Next, at step S310, the respective values of the several sensors 13 and 37 through 40 are read, and a signal is read from the temperature-setting device 41. Next, execution advances to step S320, and the target vent temperature TAO which is the target temperature for conditioned air blown into the passenger compartment is calculated from the above-described equation 1 on a basis of the values read in the foregoing step S310.

In the subsequent step S330, because flag 1 has been initialized to 0, the determination is affirmative, and execution advances to step S340. Determination for intermittent (on/off) control of the electromagnetic clutch 9 is performed. This intermittent control is control of known art to prevent frost on the evaporator 6. Specifically, the evaporator vent temperature TE detected by the evaporator vent-temperature sensor 13 is employed. When TE is less than a first set temperature (for example 3° C.), determination of the interrupted (off) side of the electromagnetic clutch 9 is performed. When TE is greater than a second set temperature (for example 4° C.), determination of the engaged (on) side of the electromagnetic clutch 9 is performed.

Herein, when the determination at step S340 is to the interrupted (off) side, execution advances to step S460 and the electromagnetic clutch 9 is interrupted (switched off). Meanwhile, when the determination at step S340 is the engaged (on) side, execution advances to step S350 and it is determined whether the compressor 2 is in a high-speed state such as when accelerating. Specifically, it is determined whether the compressor speed Nc detected by the speed sensor 40 has exceeded 2,000 rpm. When Nc is lower than 2,000 rpm, execution advances to step S440 and flag 1 is set to 0, flag 2 is set to 0, and flag 3 is set to 0. In the subsequent step S450, the electromagnetic clutch 9 is placed in an engaged (on) state and the compressor 2 is actuated.

In contrast thereto, when the compressor speed Nc exceeds 2,000 rpm, execution advances from step S350 to step S360, and flag 1 is set to 1. In the subsequent step S370, flag 2 has been initialized to 0, and so the determination becomes affirmative. At step S380, the evaporator vent temperature TEA at the time when the compressor speed Nc exceeded 2,000 rpm is set as the evaporator vent temperature TE. Also, at step S380, a control temperature α (øC) is determined on a basis of the target vent temperature TAO (øC) calculated at step S320.

Figure 16:
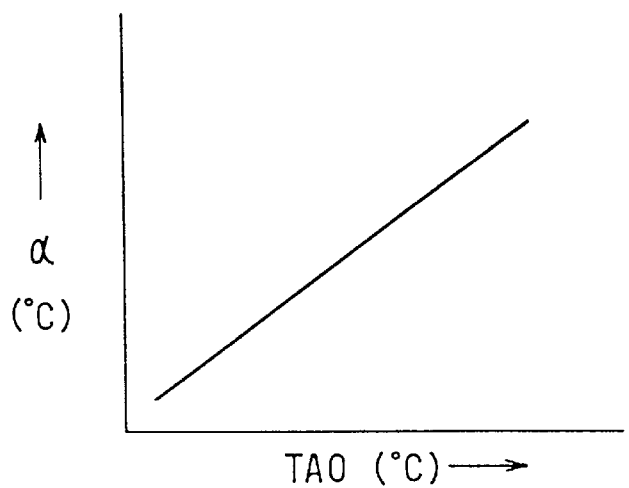
FIG. 16 is a characteristic diagram indicating the correlation between a target vent temperature TAO and a control temperature α according to the second embodiment.

This control temperature α (øC), in specific terms, is determined so as to rise together with the rise in TAO as shown in FIG. 16. Herein, a rise in TAO is a decrease in cooler thermal load from the standpoint of the refrigeration cycle, and so it can be said that the control temperature α (øC) is determined so as to rise along with a decline in cooler thermal load.

Next, at step S390 flag 2 is set to 1, and at step S400 flag 3 is set to 0. Therefore, execution advances to step S410, where on/off control of the electromagnetic clutch 9 is performed using TE.

Initially, when the compressor speed Nc has exceeded 2,000 rpm, TE invariably is TEA+α or less. Therefore, execution advances from step S410 to step S430, and the electromagnetic clutch 9 is interrupted (switched off).

Accordingly, the execution returns to step S310 and reads the values before advancing via step S320 to step S330. Because flag 1 is equal to 1, the determination is negative, and execution advances to step S350. Herein, when a state where Nc is greater than 2,000 rpm is maintained, execution advances to steps S360 and S370. Here, flag 2 is equal to 1, so execution advances to step S400, and TEA is not read.

Because flag 3 is equal to 0 at step S400, execution advances to step S410, where TE is again determined. When time after the electromagnetic clutch 9 assumes an interrupted state is reduced, the actual evaporator vent-air temperature rises. When TE becomes greater than TEA+α, the determination at step S410 is affirmative. In the subsequent step S420, flag 3 becomes equal to 1, and, at step S450, the electromagnetic clutch 9 is engaged.

Once flag 3 becomes equal to 1, the determination of step S400 becomes negative. Execution advances directly to step S450, and the electromagnetic clutch 9 is engaged (switched on), even when Nc is greater than 2,000 rpm.

When Nc becomes 2,000 rpm or less, execution advances from step S350 to step S440, and flags 1, 2, and 3 are all initialized. Execution then advances to step S450. Consequently, the electromagnetic clutch 9 is engaged irrespective of the sizes of TE and TEA+α. Thereafter, the intermittence of the electromagnetic clutch 9 is again determined on a basis of the result of step S340.

An effect of the second embodiment will be described next. When the compressor speed Nc is greater than or equal to a predetermined speed (2,000 rpm) saturating the cooling capacity, improvement in power savings, low emissions, and vehicle traveling performance of the vehicle engine 11 can be realized by interrupting the electromagnetic clutch 9 and cutting off the compressor driving force. Accordingly, when the actual evaporator vent temperature TE exceeds TEA+α (where α is approximately equal to 0.1° C. to 1° C.) after the evaporator vent temperature TEA at the time when the compressor speed Nc reached the predetermined speed (2,000 rpm) has been stored and the electromagnetic clutch 9 has been interrupted, the electromagnetic clutch 9 is engaged and the compressor 2 is again activated, and so cooling capacity can be maintained.

Thus, according to the second embodiment, power savings and cooling capacity of a vehicle engine 11 both can be obtained by intermittently actuating a fixed-volume type compressor 2 presently mounted in many cars. Consequently, the second embodiment is more advantageous than the first embodiment in being able to utilize a fixed-volume type compressor 2 of simple structure and inexpensive cost.

FIG. 16 is a block diagram depicting the devices for realizing functions in the ECU 14 which correspond to the several steps of the flow diagram shown in FIG. 15.

Third Embodiment

With the foregoing first embodiment, a refrigeration-cycle apparatus provided with an external variable-volume compressor 2 which continuously varies the volume according to the control current In was described. A third embodiment of the present invention relates to a refrigeration-cycle apparatus employing a volume-switching (two-stage variable-volume) compressor which switches the compressor volume between large and small stages according to an external control signal.

Figure 17:
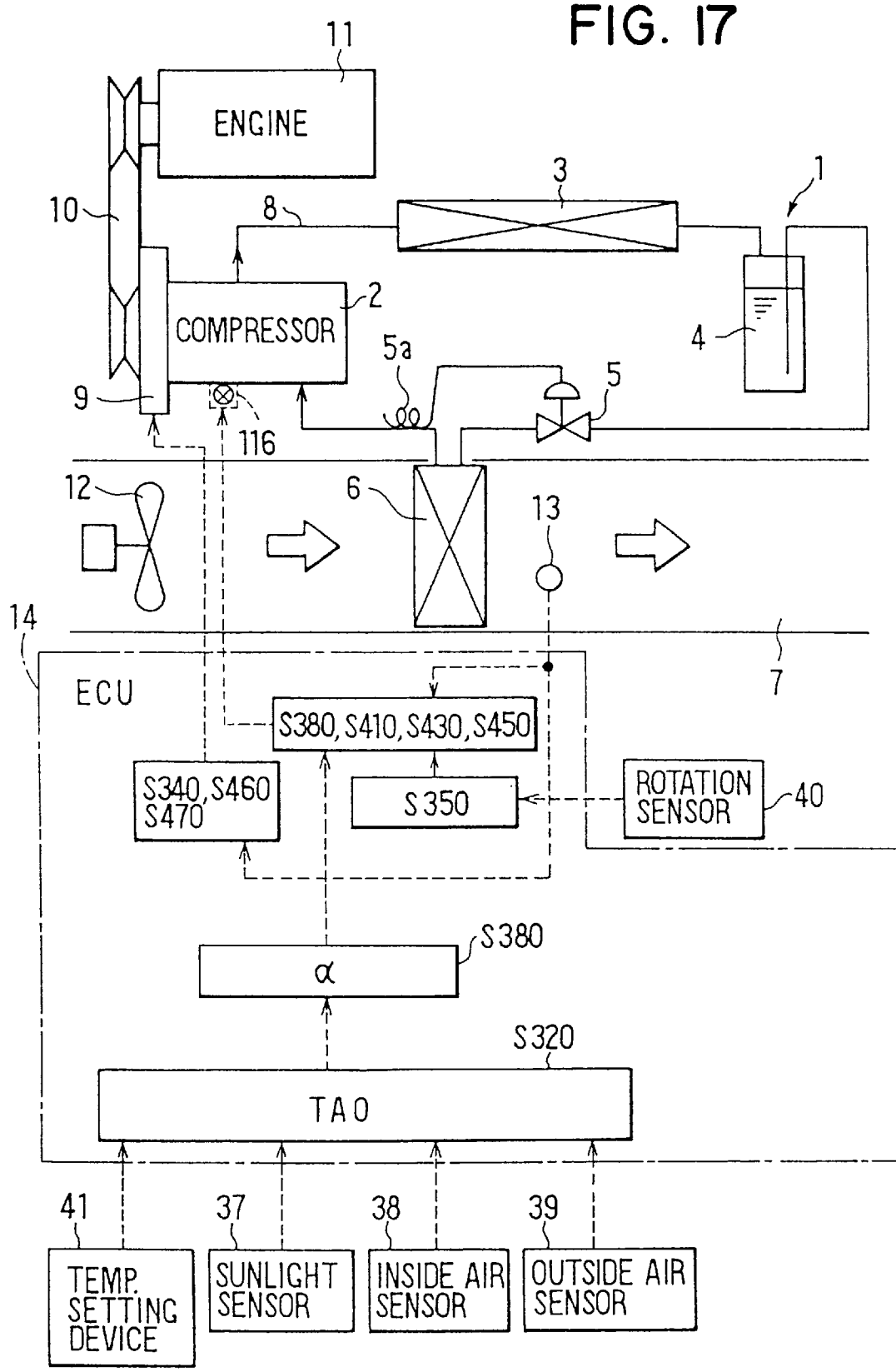
FIG. 17 is an overall structural view of a refrigeration-cycle apparatus for vehicle use indicating a third embodiment.

FIG. 17 depicts a refrigeration-cycle apparatus employing a volume-switching type compressor 2 according to the third embodiment. The apparatus differs from the apparatus in the first embodiment in that it includes a two-stage variable volume-switching mechanism in the compressor 2. Along with this, a solenoid 116 (refer to FIG. 18 which will be described later) disposed in this volume-switching mechanism is the control target of the ECU 14.

Figure 18:
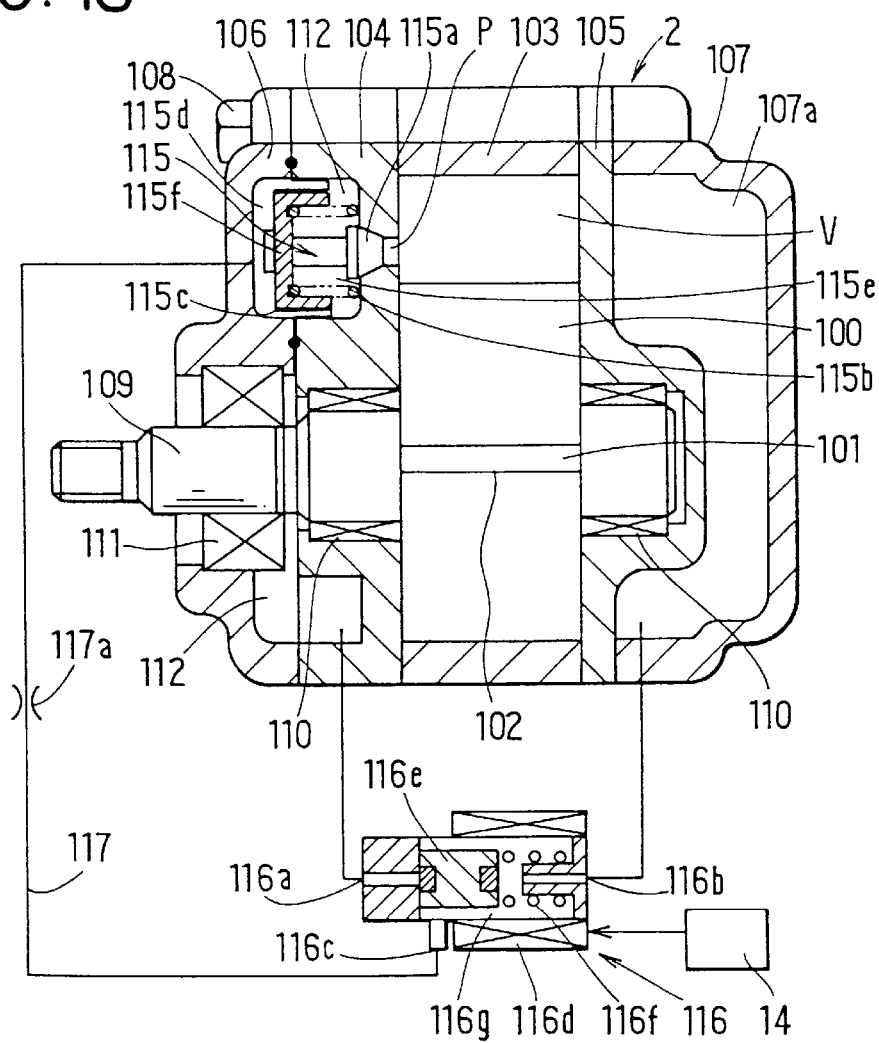
FIG. 18 is a longitudinal sectional view of a volume-switching type compressor according to the third embodiment.
Figure 19A:
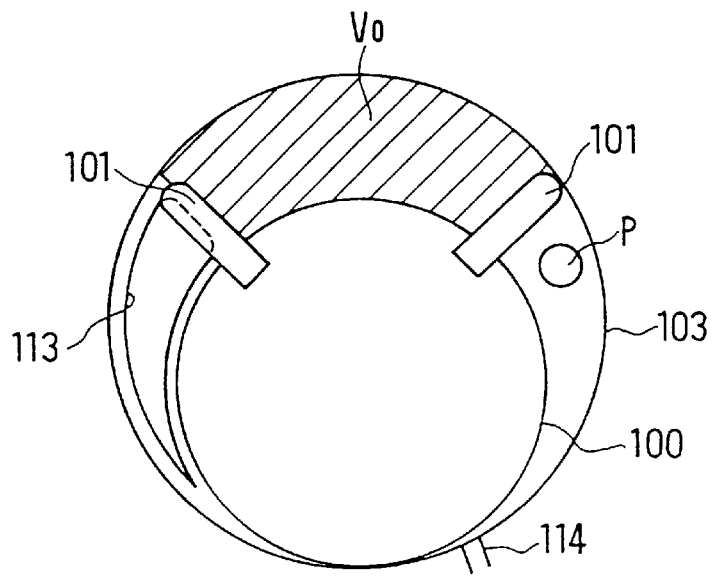
FIG. 19 is an essential transverse sectional view for describing volume-switching operation of the compressor according to the third embodiment.
Figure 19B:
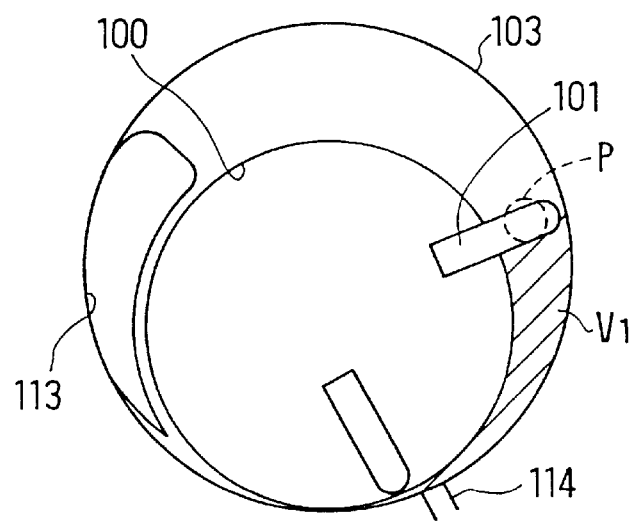
Figures 20, 22:
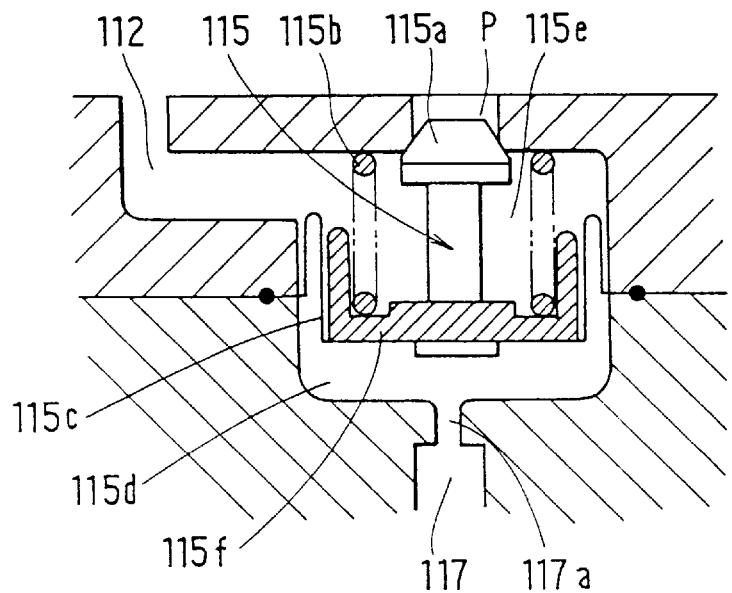
FIG. 20 is a sectional view of a switching-valve portion for volume-switching use of the compressor according to the third embodiment.
FIG. 22 is a table depicting another example of a determination method of the control temperature a according to the second and third embodiments.

First, a volume-switching type (two-stage variable-volume) compressor 2 will be described with reference to FIGS. 18–20. The compressor 2 is a vane-type compressor as shown in FIG. 18 and FIG. 19, where 100 is a cylindrical rotor. A slidable vane 101 is inserted radially in a slit 102 provided on the rotor 100. This vane 101 is actually provided with four equally spaced lobes, although only two are depicted in FIG. 19.

Here, a cylinder 103 of cylindrical configuration restricts reciprocating motion in the radial direction of the vane 101. Front side plate 104 and rear side plate 105 sandwich the two ends of the cylinder 103 via the rotor 100 and the vane 101 and a minute void. The rotor 100, vane 101, cylinder 103, front side plate 104, and rear side plate 105 form an operating space V.

The cylinder 103, front side plate 104, and rear side plate 105 are integrally fastened and fixed to a housing 106, 107 by a bolt 108. The rotor 100 is integrally joined to a rotating shaft 109, and the rotating shaft 109 is rotatingly supported on the front side plate 104 and the rear side plate 105 by bearings 110. An end portion (the left-hand end portion in FIG. 18) protrudes toward an external portion of the rotating shaft 109, and is interconnected with the electromagnetic clutch 9 of FIG. 17 so that the rotating shaft 109 receives driving force from the vehicle engine 11 via the electromagnetic clutch 9. Also, a shaft-sealing device 111 maintains a seal between the compressor interior and outside air.

An intake chamber 112 is formed by the front side plate 104 and the housing 106, and refrigerant is taken into this intake chamber 112 from the evaporator 6 in FIG. 17. The refrigerant is then sucked into the operating space V by an intake port 113 (FIG. 19) in the front side plate 104. Consequently, the operating space v is filled with refrigerant at an intake pressure.

Accordingly, refrigerant sucked into the operating space V is compressed in accompaniment with the volume reduction of the operating space V, and is discharged in a high compression state from a discharge port 114 (FIG. 19) to a discharge chamber 107a via a discharge valve (not illustrated) and the like. The refrigerant is then discharged via the refrigerant piping 108 of FIG. 17 to the condenser 3.

P is a port defined in the front side plate 104 that communicates the operating space v with the intake chamber 112. Consequently, in a state where this unloading-use port P is open, refrigerant is not compressed until the operating space V separates from a state of communication with the unloading-use port P. FIG. 19(b) shows space volume V1 when compression starts in this state where the unloading-use port P is open, and FIG. 19(a) shows space volume V0 when compression starts in a state where the unloading-use port P is closed. In this example, the unloading-use port P is opened to a position such that V1 becomes approximately 30% to 50% of V0.

In this example, a volume-switching mechanism is made up of a switching valve 115 to open and close the foregoing unloading-use port P and a three-way solenoid 116 to control opening and closing of this switching valve 115. Structure of the switching valve will be described firstly in specific terms with reference to FIG. 20. The switching valve 115 is provided with a detachable umbrella-shaped valve body 115a to open and close the port P. This valve body 115a is formed of a high-strength material such as stainless steel, and is interconnected with a plate 115f.

This plate 115f serves as a spring seat to support an end portion of a spring 115b. This spring 115b urges the valve body 115a in the opening direction (the lower portion of FIG. 20) with a predetermined load. A bellowphragm 115c is interconnected with the plate 115f, and the valve body 115a is driven by displacement of this bellowphragm 115c. The plate 115f serves to guide the displacement of the bellowphragm 115c.

A pilot chamber 115d is formed in the rear-surface side of the bellowphragm 115c. A pilot-pressure inducting passage 117 communicates with this pilot chamber 115d via a restrictor 117a so that pilot pressure, i.e., intake pressure or discharge pressure, is applied by control of the solenoid 116. Meanwhile, pressure of the intake chamber 112 is applied to a chamber 115e on the front-surface side of the bellowphragm 115c.

The solenoid 116 is a three-way switching valve provided with three pressure ports, namely an intake-pressure induction port 116a, a discharge-pressure induction port 116b, and a pilot-pressure induction port 116c, as shown in FIG. 18. The intake-pressure induction port 116a inducts the intake pressure of the intake chamber 112, and the discharge-pressure induction port 116b inducts the discharge pressure of the discharge chamber 107a. The pilot-pressure induction port 116c passes through the pilot-pressure inducting passage 117 to the pilot chamber 115d.

A magnetic valve body 116e is movably disposed within a valve chamber 116g of the solenoid 116. When energizing of an electromagnetic coil 116d is interrupted by the ECU 14, the valve body 116e is displaced by a spring 116f to a position which closes the intake-pressure induction port 116a and opens the discharge-pressure induction port 116b, as shown in FIG. 18.

As a result of this, discharge pressure is inducted to the pilot-pressure induction port 116c, and the pilot chamber 115d assumes discharge pressure. Because of this, the valve body resists the set force of the spring 115b to move in the closing direction, and the switching valve 115 closes the port P. Due to this, the discharge volume of the compressor 2 is established at the large volume (volume of 100%) shown in FIG. 19(a), and the compressor 2 runs at full capacity.

In contrast to this, when the electromagnetic coil 116d is energized by the ECU 14, the valve body 116e is displaced by the electromagnetic force of the electromagnetic coil 116d to a position which opens the intake-pressure induction port 116a and closes the discharge-pressure induction port 116b. As a result of this, intake pressure is inducted to the pilot-pressure induction port 116c, and the pilot chamber 115d assumes an intake pressure. Because of this, the valve body 115a is shifted in the opening direction by the set force of the spring 115b, and the switching valve opens the port P. Due to this, the discharge volume of the compressor 2 is established at a state of low volume (80% to 50% volume) shown in FIG. 19(b).

Figure 21:
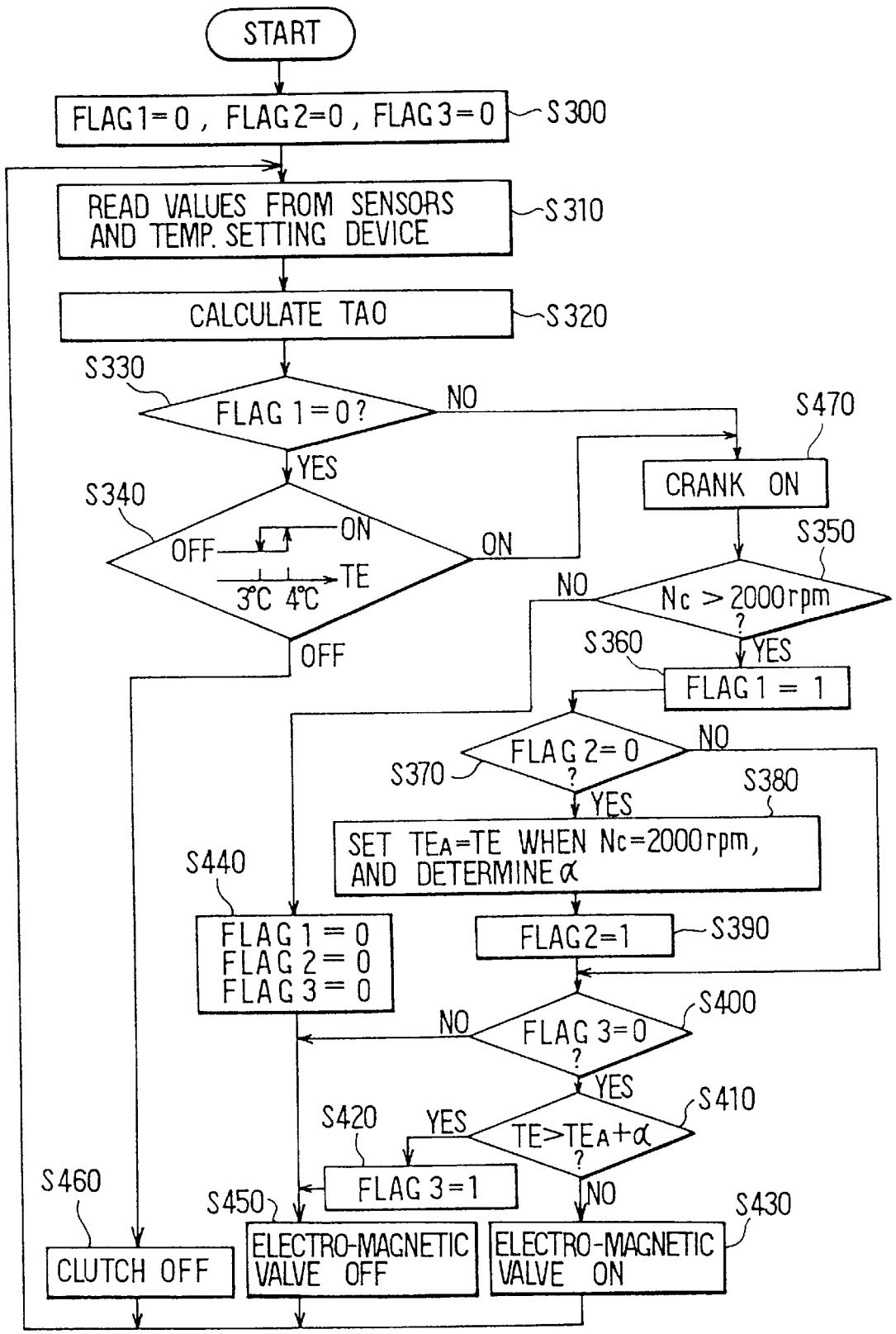
FIG. 21 is a flow diagram indicating control processing of the third embodiment.

Next, control operation performed by the ECU 14 according to the third embodiment is shown in the flow diagram of FIG. 21. The control processing is basically the same as the flow diagram of FIG. 15 according to the second embodiment. Points of difference are that the control target of steps S430 and S450 is on/off control of the solenoid 116 instead of on/off control of the electromagnetic clutch 9, and that a step S470 is provided to engage (switch on) the electromagnetic clutch 9 when the determination of step S340 is on the clutch "on" side.

That is to say, with the third embodiment, when the electromagnetic clutch is determined at step S340 to be on the "on" side, at step S470 the electromagnetic clutch 9 is engaged (switched on). Accordingly, in this state, in a case where the compressor speed Nc is 2,000 rpm or less or the compressor speed Nc is greater than 2,000 rpm, once the actual evaporator vent temperature TE becomes larger than TEA+α, execution advances to step S450. Energization of the solenoid 116 of the two-stage variable-volume compressor 2 is then interrupted (switched off), and the compressor 2 is run at 100% volume.

When the compressor speed Nc becomes greater than 2,000 rpm and the actual evaporator vent temperature TE is smaller than TEA+α, execution advances to step S430, the solenoid 116 is energized (switched on), and the compressor 2 is run at small volume.

An effect of the third embodiment will be described next. When the compressor speed Nc is increased to, or above, a predetermined speed (2,000 rpm) saturating the cooling capacity, compressor motive power can be reduced by energizing the solenoid 116 and running the compressor 2 at small volume. Improvement in power savings, low emissions, and vehicle engine performance can be realized by this. Accordingly, when the actual evaporator vent temperature TE exceeds TEA+α (where α is approximately equal to 0.1° C. to 1° C.) after the evaporator vent temperature TEA at the time when the compressor speed Nc reached the predetermined speed (2,000 rpm) has been stored and the compressor 2 has been run at small volume, energizing of the solenoid 116 is interrupted and the compressor 2 is run at large volume (100% volume). Therefore, cooling capacity (cooling feeling) can be maintained.

In this way, according to the third embodiment, power savings and cooling capacity of a vehicle engine 11 both can be obtained using the two-stage variable-volume type compressor 2, by performing large/small switching of the volume of this compressor 2. Further, the two-stage variable-volume type compressor 2 of the third embodiment is advantageous in terms of cost because the variable-volume mechanism of can be vastly simplified compared to the continuous variable-volume type compressor 2 of the first embodiment. The two-stage variable-volume type compressor 2 is generally mounted on a vehicle of intermediate luxury class because of cost considerations.

FIG. 17 is a block diagram depicting the devices for realizing functions in the ECU 14 which correspond to the several steps of the flow diagram shown in FIG. 21.

Other Embodiments (1) Modification of step S160

With the first embodiment, determination of whether the compressor 2 is in a running state proximate to maximum volume (100% volume) was performed with the outside-air temperature Tam and the control-current value In. However, the control pressure Pc of the control-pressure chamber 26 may be compared with the intake pressure Ps of the intake-pressure chamber 25, and volume determined to be 100% when Pc equals Ps.

It also is possible to determine a running state of the compressor 2 proximate to maximum volume (100% volume) by directly detecting the compressor volume with a piston-stroke detecting device made up for example of a position sensor, a limit switch, or the like.

(2) Modification of steps S170 and S350

With the above-described embodiments, a high-speed state of the compressor 2 was determined using the compressor speed Nc. However, it is possible to determine a high-speed state of the compressor 2 by detecting the speed of the vehicle engine 11 driving the compressor 2, and the vehicle speed.

Other than this, the compressor 2 may be determined to be in a high-speed state in a case where a throttle-position sensor (accelerator-opening detecting device) is provided to detect the opening degree of the throttle valve of the vehicle engine 11, and the throttle-valve opening degree (accelerator opening degree) has become a fixed amount or more according to this throttle-position sensor.

Additionally, with the above-described embodiments, a high-speed state of the compressor 2 was determined using a single set value of the compressor speed Nc being equal to 2,000 rpm. However, this set value for high-speed state determination may be divided into two and hysteresis provided. For example, when the compressor speed Nc rises, a value of NC≧2,000 may be determined to be a high-speed state, and when the compressor speed Nc declines, a departure from the high-speed state may be determined by Nc≧1,700 rpm.

(3) Modification of step S220

With the first embodiment, at step S220, the control current In is calculated from the evaporator vent temperature TEA at a time when the compressor speed Nc exceeded 2,000 rpm. However, the intake pressure Ps may be detected using for example a pressure-detecting device, and the control current In may be calculated directly from the intake pressure Ps on a basis of the map of FIG. 9.

That is to say, compressor-volume control according to this invention can be performed by detecting the intake pressure Ps, the surface temperature of the evaporator 6, the refrigerant evaporation temperature of the evaporator 5, or the like instead of the evaporator vent temperatures TE and TEA as a physical quantity relating to a degree of chilling of the evaporator 6.

(4) Modification of steps S210 and S380

The physical quantity relating to a degree of chilling of the evaporator 6 at a time when the compressor speed Nc has risen to a predetermined speed (for example, 2,000 rpm) may be a physical quantity prior to, or subsequent to, the rise of the compressor speed Nc to the predetermined speed.

(5) Modification of the determination method of the control temperature α at step S380

With the second and third embodiments, the control temperature α is determined in accordance with the target vent temperature TAO as shown in FIG. 16. However, it is sufficient for the control temperature α to be established in relation to the state of cooler thermal load and to become larger as the cooler thermal load becomes smaller. For this reason, one or a plurality of physical quantities among a plurality of physical quantities relating to the state of cooler thermal load shown in FIG. 22, for example, 1) the outside-air temperature Tam, 2) the inside-air temperature Tr, 3) the amount of sunlight Ts, 4) the evaporator vent temperature TE, 5) air quantity W of the blower 12, and 6) the set temperature Tset, may be employed to determine the control temperature α in correspondence with change in these physical quantities.

In a case of employing the physical quantities of 1) through 5), the control temperature a is made smaller as 1) through 5) increase. Conversely, in a case of the set temperature Tset of 6), the control temperature α is made larger as Tset increases.

Additionally, an optimal value may be determined from experimentation or the like and the control temperature a fixed at this optimal value, without making the control temperature α a variable value which changes in relation to the state of cooler thermal load as was described above.

(6) Modification of steps S340 and S380

With the second and third embodiments, the evaporator vent temperature TEO is detected as a physical quantity relating to a degree of chilling of the evaporator 6, but the intake pressure Ps, the surface temperature of the evaporator 6, the refrigerant evaporation temperature of the evaporator 5, or the like may be detected, as described in the foregoing section (3).

(7) Modification of the compressor volume-varying mechanism

With the first embodiment, the electromagnetic-type pressure controller 23 is utilized as the continuous volume-varying mechanism of the compressor 2. However, it is also possible to utilize an actuator such as a servomotor as a mechanism to directly drive-control the volume-varying member, without utilizing the electromagnetic-type pressure controller 23. Additionally, the continuous volume-varying mechanism of the compressor 2 is not exclusively restricted to a device which changes the tilt angle of the swash plate 16, but of course can apply this invention similarly also in various other mechanisms of known art.

With the third embodiment, a vane type compressor as described as the two-stage variable-volume mechanism of the compressor 2. Of course, the two-stage variable-volume mechanism can be utilized with other types of compressors as well.

Additionally, in the third embodiment, the volume-switching mechanism of the compressor 2 may employ large/medium/small three-stage switching, and not large/small two-stage switching. In this case, various control is possible, wherein volume switching in a high-speed state of the compressor 2 is caused to be large/medium/small three-stage switching, large/medium two-stage switching, large/small two-stage switching, or the like.

What is claimed is:

1. A motor vehicle refrigeration-cycle apparatus, comprising:

an evaporator that chills a designated space;

a compressor that compresses gas refrigerant evaporated by said evaporator; and a control mechanism that controls said compressor, so that, when said compressor reaches a high-speed, said control mechanism sustains said compressor at an operating state corresponding to a degree of chilling of said evaporator when said high-speed of said compressor was reached, said control mechanism having a memory device, said memory device memorizing said degree of chilling of the evaporator when said high-speed of said compressor was reached, said evaporator being maintained at said degree of chilling memorized by said memory device by controlling a refrigerant discharge volume from said compressor while said compressor is at said high speed.

2. The apparatus of claim 1, further comprising a volume-varying mechanism that operatively communicates with said compressor, and that varies compressor refrigerant volume according to received control signals when said compressor reaches said high-speed to sustain the degree of chilling of said evaporator at the degree when said high-speed was reached.

3. The apparatus of claim 2, wherein said volume-varying mechanism comprises a volume-varying member that varies the volume of said compressor; and an electromagnetic-type pressure controller that generates control pressure to displace said volume-varying member;

said electromagnetic-type pressure controller including a control pressure chamber wherein said control pressure is generated, a discharge pressure chamber wherein discharge pressure of said compressor is applied, and an intake pressure chamber wherein intake pressure of said compressor is applied;

said control pressure chamber communicating with both said discharge pressure chamber and said intake pressure chamber;

a variable-aperture mechanism disposed between said control pressure chamber and said discharge pressure chamber;

said electromagnetic-type pressure controller further including an electromagnetic mechanism wherein electromagnetic force is varied according to external control signals, and a pressure-actuated mechanism displaced in accordance with a set pressure and said intake pressure; and an aperture quantity of said variable-aperture mechanism is adjusted by said electromagnetic mechanism and said pressure-actuated mechanism, causing said control pressure to change.

4. The apparatus of claim 3, wherein determination of whether said compressor is in a running state proximate to maximum volume is based on a current quantity flowing to said electromagnetic mechanism, and a parameter relating to an air-conditioning thermal load.

5. The apparatus of claim 4, wherein atmospheric temperature is used as a parameter relating to the air-conditioning thermal load.

6. The apparatus of claim 1, further comprising a clutch disposed between said vehicle engine and said compressor that allows said compressor to be intermittently operated to sustain the degree of chilling of said evaporator when said compressor reaches said high-speed.

7. The apparatus of claim 6, wherein a measured parameter, relating to the degree of chilling of said evaporator when said compressor reaches said high-speed, is stored;

said clutch is caused to assume an off state, and said compressor is stopped, at a time when an actual degree of chilling of said evaporator is lower than a sum of said stored physical quantity and a predetermined value; and said clutch is caused to assume an on state and said compressor is caused to operate at a time when the actual degree of chilling of said evaporator is higher than the sum.

8. The apparatus of claim 1, wherein said compressor is a variable volume compressor; and the apparatus further includes a volume-switching mechanism that communicates with said compressor to switch a volume of said compressor among a plurality of stages according to external control signals;

wherein, when said compressor operates at the high-speed, the volume of said compressor is switched among said plurality of stages to sustain said evaporator at the degree of chilling of said evaporator when said compressor reaches the high-speed.

9. The apparatus of claim 8, wherein:

a parameter relating to the degree of chilling of said evaporator when said compressor assumes the high-speed is stored;

the volume of said compressor is switched to a small volume by said volume-switching mechanism at a time when an actual degree of chilling of said evaporator is lower than a sum of said stored physical quantity, plus a predetermined value; and the volume of said compressor is switched to a large volume by said volume-switching mechanism at a time when the actual degree of chilling of said evaporator is higher than said sum.

10. The apparatus of claim 9, wherein said predetermined value is a stored fixed value.

11. The apparatus of claim 9, wherein said predetermined value is a variable value that increases in correspondence with a decline in a thermal load of said evaporator.

12. The apparatus of claim 2, wherein said volume-varying mechanism continuously varies compressor refrigerant volume according to received control signals when said compressor is at said high-speed.

13. The apparatus of claim 1, wherein:

the control mechanism has a detecting device for detecting whether the compressor is in the vicinity of a maximum volume driving state or not;

the memory device memorizes the degree of chilling of the evaporator when the high-speed was reached, when the compressor is determined by the detecting device as being in the vicinity of maximum volume driving state; and the refrigerant discharge volume of the compressor is controlled to maintain the degree of chilling of the evaporator memorized in the memory device as long as the compressor is at high-speed.

14. The apparatus of claim 1, wherein said compressor is driven by a vehicle engine.

15. A method for controlling a motor vehicle air conditioner including an evaporator that chills a designated space, and a compressor, driven by a vehicle engine at a designated speed, that compresses gaseous refrigerant evaporated by said evaporator, comprising the steps of:

communicating with said compressor to vary compressor operation according to received control signals;

determining that said compressor is in a vicinity of a maximum volume driving state and in a high-speed state when the speed of said compressor has risen to at least a predetermined value;

memorizing a degree of chilling of the evaporator when the compressor reaches the high-speed state; and controlling compressor volume while said compressor is in said high-speed state, to sustain said evaporator at the memorized degree of chilling by controlling a refrigerant discharging volume from said compressor.

16. The method of claim 15, wherein said step of determining comprises determining whether said compressor is in a vicinity of a maximum volume driving state as well as in the high-speed state based on a current quantity flowing to a electromagnetic mechanism, and a parameter relating to an air-conditioning thermal load.

17. The method of claim 16, wherein atmospheric temperature is used to relate to the air-conditioning thermal load in said step of determining.

18. The method of claim 15, wherein said step of controlling compressor volume comprises causing intermittent operation of a clutch located between the vehicle engine and the compressor to sustain said evaporator at the degree of chilling when said high-speed state was assumed, while said compressor is in said high-speed state.

19. The method of claim 15, wherein said step of controlling compressor volume comprises controlling the volume of the compressor by switching among fixed volume stages to sustain of said evaporator at said degree of chilling when said high-speed state was assumed.

* * * * *